US008696142B2

(12) United States Patent
Osaka et al.

(10) Patent No.: US 8,696,142 B2
(45) Date of Patent: Apr. 15, 2014

(54) MOBILE ELECTRONIC DEVICE WHICH INCLUDES A PROJECTOR THAT PROJECTS AN IMAGE ON A PROJECTION AREA

(75) Inventors: Masashi Osaka, Yokohama (JP); Yasuhiro Ueno, Yokohama (JP); Yasushi Kitamura, Yokohama (JP); Seiji Horii, Yokohama (JP); Jouji Yoshikawa, Yokohama (JP); Tomoko Asano, Yokohama (JP); Hiroki Itou, Yokohama (JP)

(73) Assignee: Kyocera Corporation, Kyoto (JP)

( * ) Notice: Subject to any disclaimer, the term of this patent is extended or adjusted under 35 U.S.C. 154(b) by 176 days.

(21) Appl. No.: 13/202,657

(22) PCT Filed: Feb. 25, 2010

(86) PCT No.: PCT/JP2010/052929
§ 371 (c)(1),
(2), (4) Date: Aug. 22, 2011

(87) PCT Pub. No.: WO2010/098374
PCT Pub. Date: Sep. 2, 2010

(65) Prior Publication Data
US 2011/0306388 A1    Dec. 15, 2011

(30) Foreign Application Priority Data

Feb. 25, 2009   (JP) .................................. 2009-043196
Mar. 26, 2009   (JP) .................................. 2009-077781

(51) Int. Cl.
*G03B 21/20* (2006.01)

(52) U.S. Cl.
USPC ................. 353/85; 353/69; 353/70; 353/119; 353/121; 353/122; 455/556.1; 356/614

(58) Field of Classification Search
USPC ............... 353/15, 69, 70, 74, 78, 79, 85, 100, 353/119, 122; 356/601–603, 614, 623–625; 349/5, 7–9; 455/556.1; 250/239
See application file for complete search history.

(56) References Cited

U.S. PATENT DOCUMENTS

| 7,690,797 | B2 | 4/2010 | Higashi |
| 7,896,499 | B2* | 3/2011 | Noba ............................. 353/28 |
| 7,926,958 | B2* | 4/2011 | Choi et al. .................... 353/119 |
| 8,382,296 | B2* | 2/2013 | Itoh et al. ..................... 353/119 |
| 2004/0165154 | A1 | 8/2004 | Kobori et al. |
| 2005/0046804 | A1* | 3/2005 | Akutsu .......................... 353/70 |
| 2005/0128578 | A1 | 6/2005 | Sugawara et al. |

(Continued)

FOREIGN PATENT DOCUMENTS

| JP | 2003-283964 A | 10/2003 |
| JP | 2004-070298 A | 3/2004 |

(Continued)

OTHER PUBLICATIONS

International Search Report for PCT/JP2010/052929 mailed Apr. 27, 2010.

(Continued)

*Primary Examiner* — Sultan Chowdhury
(74) *Attorney, Agent, or Firm* — Lowe Hauptman & Ham, LLP

(57) ABSTRACT

It is an object to provide a mobile electronic device with high operability and high safety. The mobile electronic device includes an image projector that projects an image, a control unit that controls the operation of the image projector, a cabinet that holds the image projector and the control unit, and an acceleration sensor that detects an acceleration acting on the cabinet. The object is achieved in such a manner that when an acceleration of a given value or more is detected by the acceleration sensor, the control unit stops emission of light from the image projector or reduces an amount of light emitted from the image projector.

5 Claims, 11 Drawing Sheets

(56) References Cited

U.S. PATENT DOCUMENTS

| | | |
|---|---|---|
| 2005/0184958 A1 | 8/2005 | Gnanamgari et al. |
| 2007/0120983 A1 | 5/2007 | Yamamoto et al. |
| 2007/0171393 A1* | 7/2007 | Cho et al. ............ 356/4.01 |
| 2008/0055566 A1* | 3/2008 | Yun ....................... 353/82 |
| 2008/0212041 A1 | 9/2008 | Koizumi et al. ........ 353/122 |
| 2009/0036158 A1* | 2/2009 | Fujinawa et al. ....... 455/556.1 |
| 2009/0143098 A1* | 6/2009 | Shiono ................ 455/556.1 |
| 2009/0147224 A1 | 6/2009 | Kurozuka et al. |

FOREIGN PATENT DOCUMENTS

| | | |
|---|---|---|
| JP | 2005-352172 A | 12/2005 |
| JP | 2006-133401 A | 5/2006 |
| JP | 2007-096542 A | 4/2007 |
| JP | 2007-228551 A | 9/2007 |
| JP | 2008-083453 A | 4/2008 |
| JP | 2008-249783 A | 10/2008 |
| JP | 2009-003281 A | 1/2009 |
| WO | 2007034875 A1 | 3/2007 |

OTHER PUBLICATIONS

Office Action mailed May 28, 2013 corresponds to Japanese patent application No. 2009-244025.
International Search Report for PCT/JP2010/052931 mailed Apr. 27, 2010.

* cited by examiner

FIG.7A

|  | OPERATING MODE ||
|---|---|---|
|  | STATIONARY MODE | MOBILE MODE |
| WHEN PLACED ON CHARGING BASE OR WHEN ATTACHED WITH AC ADAPTER | SELECTABLE | NOT SELECTABLE |
| WHEN NOT PLACED ON CHARGING BASE AND WHEN NOT ATTACHED WITH AC ADAPTER | NOT SELECTABLE | SELECTABLE |

FIG.7B

|  | OPERATING MODE ||
|---|---|---|
|  | STATIONARY MODE | MOBILE MODE |
| WHEN PLACED ON CHARGING BASE OR WHEN ATTACHED WITH AC ADAPTER | SELECTABLE | NOT SELECTABLE |
| WHEN NOT PLACED ON CHARGING BASE AND WHEN NOT ATTACHED WITH AC ADAPTER | SELECTABLE | SELECTABLE |

FIG.7C

|  | OPERATING MODE ||
|---|---|---|
|  | STATIONARY MODE | MOBILE MODE |
| WHEN PLACED ON CHARGING BASE OR WHEN ATTACHED WITH AC ADAPTER | SELECTABLE | SELECTABLE |
| WHEN NOT PLACED ON CHARGING BASE AND WHEN NOT ATTACHED WITH AC ADAPTER | NOT SELECTABLE | SELECTABLE |

FIG.7D

|  | OPERATING MODE ||
|---|---|---|
|  | STATIONARY MODE | MOBILE MODE |
| WHEN PLACED ON CHARGING BASE OR WHEN ATTACHED WITH AC ADAPTER | SELECTABLE | SELECTABLE |
| WHEN NOT PLACED ON CHARGING BASE AND WHEN NOT ATTACHED WITH AC ADAPTER | SELECTABLE | SELECTABLE |

MOBILE ELECTRONIC DEVICE WHICH INCLUDES A PROJECTOR THAT PROJECTS AN IMAGE ON A PROJECTION AREA

CROSS-REFERENCE TO RELATED APPLICATION

This application is a National Stage of International Application No. PCT/JP2010/052929, filed on Feb. 25, 2010 which designates the United States and claims the benefit of priority from Japanese Patent Application No. 2009-043196, filed on Feb. 25, 2009, and Japanese Patent Application No. 2009-077781, filed on Mar. 26, 2009.

TECHNICAL FIELD

The present invention relates to a mobile electronic device including an image projector for projecting an image to a screen or to a wall surface.

BACKGROUND

Background Art

As a conventional device for projecting an image to a wall surface or a screen, a so-called projector is used. A mainstream of the projector is a so-called stationary type device which is supplied with power from a commercial power supply and is used when it is fixed to a predetermined location. A projector as the stationary type projects, in its fixed state, an image to a given portion of the wall surface or to the screen.

Recently, on the other hand, a mobile projector compact in size and easy to carry is proposed as the projector. For example, Patent Literature 1 describes a mobile terminal with a projector function which incorporates a projector that includes an upper cabinet, a lower cabinet, and a hinge portion for mutually pivotally connecting the upper cabinet and the lower cabinet and that has a lens and a light source.

This type of mobile projector can easily change an area to which an image is projected by the projector. That is, the projector can easily change a light irradiation direction. Therefore, the light may be unintentionally irradiated to a person. Because the projector irradiates high-intensity light, if the light irradiated from the projector directly enters person's eyes at a close position, the person is very dazzled by the irradiated light.

In terms of this point, for example, Patent Literature 2 describes a mobile communication terminal with a projection function that includes a projector for projecting projection data, a detector for detecting a state of the mobile communication terminal, a movement determining unit for determining whether there is any change in the state detected by the detector, and a control unit for sending the projection data to the projector. The mobile communication terminal is capable of controlling a light amount when a person enters a projected light area by transmitting control data for controlling a light amount to be projected by the control unit when the movement determining unit determines that there is a change in the state of the terminal.

CITATION LIST

Patent Literature

Patent Literature 1: Japanese Patent Application Laid-open No. 2007-96542

Patent Literature 2: Japanese Patent Application Laid-open No. 2007-228551

DISCLOSURE OF INVENTION

Problem to be Solved by the Invention

As described in Patent Literature 2, when the state of the terminal changes, the amount of light output from the projector is reduced or the output thereof is stopped, so that a possibility that a direct light may enter person's eyes or that the person may be dazzled by the light can be reduced while an operator is operating the terminal.

Even if there is no change in the state of the terminal, the light output from the projector may enter person's eyes because surroundings change or the person moves. However, the terminal described in Patent Literature 2 cannot respond to this point because it is configured not to reduce an amount of light to be output or not to stop the output if there is no change in the state of the terminal. Therefore, the terminal described in Patent Literature 2 has the possibility that a strong light may enter the person's eyes and this causes the person to be dazzled by the light. The terminal described in Patent Literature 2 is also capable of manually stopping the output, however, the operation is required. Besides, it is difficult to quickly respond to this case that requires an instant reaction.

It is an object of the present invention to provide a mobile electronic device with high operability and high safety.

SUMMARY OF THE INVENTION

According to an aspect of the present invention, a mobile electronic device includes: an image projector that projects an image; a control unit that controls an operation of the image projector; a cabinet that holds the image projector and the control unit; and a detector that detects a physical amount changing according to force acting on the cabinet. The control unit sets an amount of light from the image projector based on a result of detection by the detector.

According to another aspect of the present invention, the detector is an acceleration sensor that detects an acceleration acting on the cabinet. When an acceleration of a given value or more is detected by the acceleration sensor, the control unit stops emission of light from the image projector or reduces an amount of light emitted from the image projector.

According to another aspect of the present invention, when the acceleration of the given value or more is detected by the acceleration sensor, the control unit stops the emission of light from the image projector or reduces the amount of light emitted from the image projector. Thereafter, the control unit resumes projection of an image with a normal amount of light from the image projector only when it is detected that a preset operation is received.

According to another aspect of the present invention, the mobile electronic device further includes a storage unit that stores therein a correspondence between a detected value detected by the detector and an amount of light emitted from the image projector. The detector is an acceleration sensor that detects an acceleration acting on the cabinet. The control unit sets an amount of light emitted from the image projector based on a detected value detected by the acceleration sensor and the correspondence stored in the storage unit.

According to another aspect of the present invention, the acceleration sensor includes an acceleration detector that detects an acceleration, and a pattern detector that calculates an operation pattern based on a detected value detected by the acceleration detector. The storage unit further stores therein an operation-pattern correspondence between the operation pattern and the amount of light emitted from the image projector. The control unit sets an amount of light emitted from the image projector based on the operation pattern detected by the pattern detector and the operation-pattern correspondence.

According to another aspect of the present invention, the detector is a 6-axis sensor including an acceleration detector that detects accelerations in the three directions acting on the cabinet and a geomagnetic detector that detects geomagnetism in the three directions. When at least either one of the acceleration acting on the cabinet and a rotation range of the cabinet detected by the 6-axis sensor exceeds a given value or more, the control unit stops emission of light from the image projector or reduces an amount of light emitted from the image projector.

According to another aspect of the present invention, the mobile electronic device further includes a storage unit that stores therein a correspondence between a detected value detected by the 6-axis sensor and an amount of light emitted from the image projector. The control unit sets an intensity of light emitted from the image projector based on the detected value by the 6-axis sensor and the correspondence.

According to another aspect of the present invention, the 6-axis sensor includes a pattern detector that calculates an operation pattern based on at least either one of detected values detected by the acceleration detector and by the geomagnetic detector. The storage unit stores therein a respective correspondence for each operation pattern. The control unit determines a correspondence to be used based on the operation pattern detected by the pattern detector.

Effect of the Invention

The mobile electronic device according to the present invention can perform more appropriate control by controlling the amount of light to be emitted from the image projector based on the result of detection by the detector. Thus, there is such an effect that the operability and the safety can be enhanced.

BRIEF DESCRIPTION OF DRAWINGS

FIG. 7A is an explanatory diagram of one example of controls in the mobile electronic device.

FIG. 7B is an explanatory diagram of one example of controls in the mobile electronic device.

FIG. 7C is an explanatory diagram of one example of controls in the mobile electronic device.

FIG. 7D is an explanatory diagram of one example of controls in the mobile electronic device.

DESCRIPTION OF EMBODIMENTS

The present invention will be explained in detail below with reference to the drawings. It should be noted that the present invention is not limited by the following explanation. Besides, the components explained in the following include those that can be easily thought of by persons skilled in the art, and substantially equivalents or those in an equivalent scope. A mobile phone as a mobile electronic device will be explained hereinafter as an example, however, an applied target of the present invention is not limited to the mobile phone. The present invention can also be applied to, for example, PHS (Personal Handyphone System), PDA, a portable navigation device, a notebook-size personal computer, and a game machine.

Figure 1:
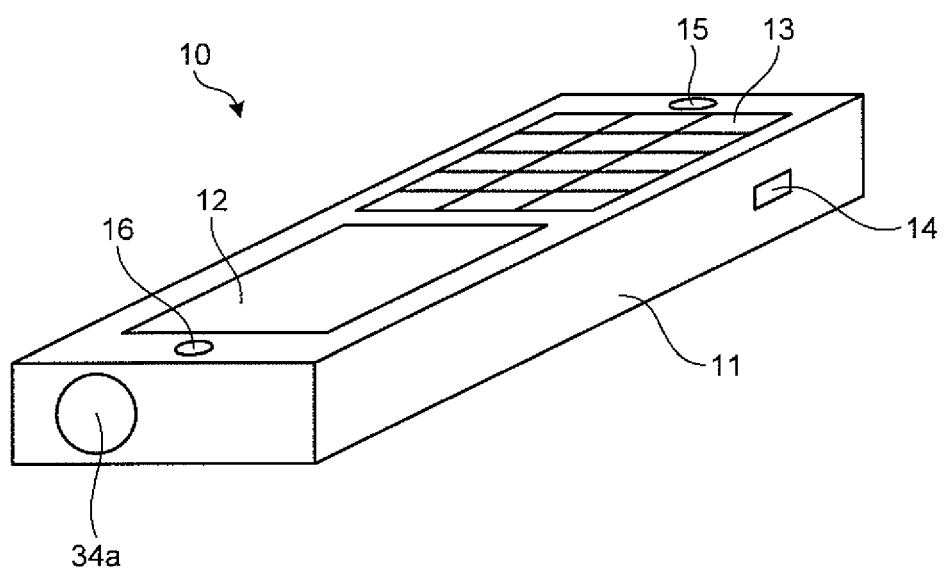
FIG. 1 is a perspective view illustrating a schematic configuration of one embodiment of a mobile electronic device.

First, an external configuration of the mobile electronic device is explained. FIG. 1 is a perspective view illustrating a schematic configuration of one embodiment of the mobile electronic device. A mobile electronic device 10 is a mobile phone provided with a wireless communication function. The mobile electronic device 10 is a straight mobile phone with units stored inside of one box-shaped cabinet 11. In the present invention, the cabinet 11 is formed to a box shape, however, the cabinet may be formed with two members coupled to each other by a hinge and thereby be foldable, or the cabinet may be configured to have two members which are slidable. A cabinet connected with three or more members can also be used.

The cabinet 11 is provided with a display 12 as a display unit illustrated in FIG. 1. The display 12 displays a predetermined image, such as a standby image when the mobile electronic device 10 is in a standby state for waiting for reception and a menu image used to help operation of the mobile electronic device 10.

The cabinet 11 is provided with a plurality of operation keys 13 used to enter a telephone number of an intended party or to enter text when an email is created. In addition, a dedicated key 14 for controlling operations of a projector 34, explained later, is provided in one of sides of the cabinet 11 (one of faces substantially orthogonal to a face where the operation keys 13 are provided). The operation keys 13 and the dedicated key 14 constitute an operating unit of the mobile electronic device 10. The cabinet 11 is also provided with a microphone 15 that receives a voice during talking on the mobile electronic device 10, and with a receiver 16 that emits voice during talking on the mobile electronic device 10.

A light emitting portion 34a of the projector 34 for projecting an image is provided on a top face of the cabinet 11 (one side of the top face meets a face where the operation keys 13 are provided and one side of the other sides meets a face where the dedicated key 14 is provided).

Figure 2:
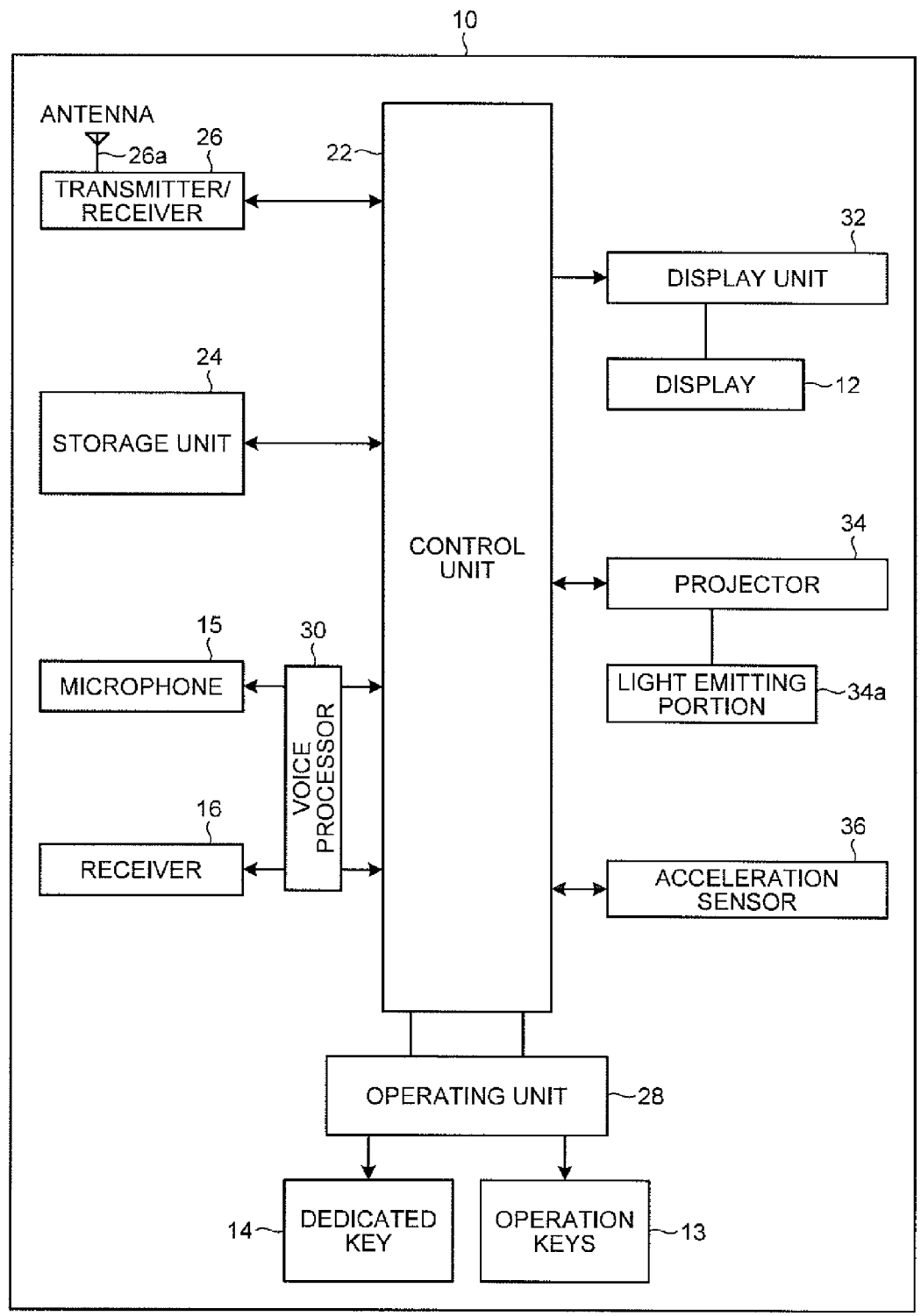
FIG. 2 is a block diagram of the schematic configuration of the mobile electronic device illustrated in FIG. 1.

FIG. 2 is a block diagram illustrating the schematic configuration of functions of the mobile electronic device as illustrated in FIG. 1. The mobile electronic device 10 as illustrated in FIG. 2 includes a control unit 22, a storage unit 24, a transmitter/receiver 26, an operating unit 28, a voice processor 30, a display unit 32, the projector 34, and an acceleration sensor 36.

The control unit 22 is a processor such as a CPU (central processing unit) that integrally controls an overall operation of the mobile electronic device 10. That is, the control unit 22 controls the operations of the transmitter/receiver 26, the voice processor 30, and the display unit 32 or the like so that the various processes of the mobile electronic device 10 are executed in an appropriate sequence according to the operation of the operating unit 28 and software stored in the storage unit 24 of the mobile electronic device 10. The various processes of the mobile electronic device 10 include, for example, voice communication performed through a line switching network, creation and transmission/reception of an electronic mail, and browsing to a Web (World Wide Web) site on the Internet. In addition, the operations of the transmitter/receiver 26, the voice processor 30, and the display unit 32 or the like include signal transmission/reception by the transmitter/receiver 26, voice input/output by the voice processor 30, and display of an image by the display unit 32.

The control unit 22 executes processes based on programs (e.g., operating system program and application programs) stored in the storage unit 24. The control unit 22 is formed with, for example, a MPU (Micro Processing Unit), and executes the various processes of the mobile electronic device 10 according to the sequence instructed by the software. That is, the control unit 22 sequentially loads operation codes from the operating system program and the application programs stored, in the storage unit 24, and executes the processes.

The control unit 22 has a function of executing a plurality of application programs. The application program executed by the control unit 22 includes a plurality of application programs such as an application program for controlling the drive of the projector and game application programs for activating various games.

The storage unit 24 stores therein software and data used for processes performed by the control unit 22, a task for activating an application program that controls the drive of the projector and a task for activating various game application programs.

The storage unit 24 stores therein, in addition to these tasks, for example, voice data through communication and downloaded voice data, or software used by the control unit 22 for controlling the storage unit 24, and telephone numbers and email addresses of communication opposite parties, and also stores therein addresses to be managed, a sound file of a dial tone and a ring tone or the like, temporary data used for a process of software. The computer programs and the temporary data used for the processes of the software are temporarily stored in a work area allocated to the storage unit 24 by the control unit 22. The storage unit 24 is formed with, for example, a nonvolatile storage device (e.g., nonvolatile semiconductor memory such as ROM: Read Only Memory, and a hard disk drive), and a readable/writable storage device (e.g., SRAM: Static Random Access Memory, and DRAM: Dynamic Random Access Memory).

The transmitter/receiver 26 includes an antenna 26a, and establishes a wireless signal line based on CDMA system with a base station through a channel allocated by the base station, and performs telephone communication and information communication with a base station.

The operating unit 28 is formed with the operation keys 13 such as Power key, Talk key, Numeric keys, Character keys, Direction key, OK key, and Send key to which various functions are allocated respectively, and with the dedicated key 14. When these keys are used to enter information through the operation by the user, the operating unit 28 emits a signal corresponding to the content of the operation. The emitted signal is input to the control unit 22 as an instruction of the user.

The voice processor 30 executes processes of a voice signal input to the microphone 15 and a voice signal output from the receiver 16. That is, the voice processor 30 amplifies the voice input through the microphone 15, subjects the voice to AD conversion (Analog to Digital conversion), then further subjects the voice to signal processing such as coding, converts the coded voice to digital voice data, and outputs the digital voice data to the control unit 22. Moreover, the voice processor 30 decodes the digital voice data sent from the control unit 22, subjects the decoded data to DA conversion (Digital to Analog conversion), subjects the converted data to processes such as amplification to be converted to an analog voice signal, and outputs the analog voice signal to the receiver 16.

The display unit 32 is provided with a display panel (such as the display 12) formed with a LCD (Liquid Crystal Display) or an organic EL (Electro-Luminescence) panel or the like, and displays a video image according to video data supplied from the control unit 22 and an image according to image data on the display panel. The display unit 32 may be provided with, for example, a sub-display at a location that is exposed to the outside even when the cabinet is closed, in addition to the display 12.

Figure 3:
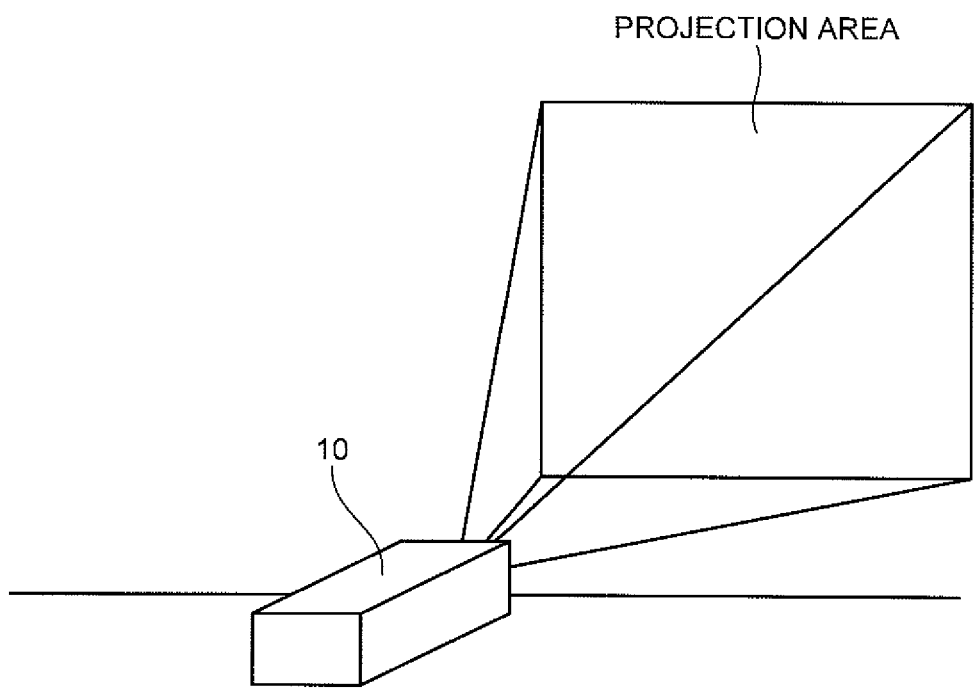
FIG. 3 is an explanatory diagram illustrating a state in which an image is displayed by the mobile electronic device illustrated in FIG. 1.

The projector 34 is an image projection mechanism for projecting an image, and, as explained above, is provided with the light emitting portion 34a for projecting an image, on the top face of the cabinet 11. FIG. 3 is an explanatory diagram illustrating a state in which an image is displayed by the mobile electronic device as illustrated in FIG. 1. The mobile electronic device 10 projects an image from the light emitting portion 34a of the projector 34. In other words, by emitting the light forming the image, as illustrated in FIG. 3, an image can be projected to a given area (projection area) of a wall surface or a screen on a plane opposite to the top face of the cabinet 11. The operation of projector 34 is controlled by the control unit 22, so that various video images such as films and presentation materials sent from the control unit 22 are projected and displayed on the projection area.

The projector 34 is formed with a light source and an optical system that switches whether the light emitted from the light source is projected, according to the image data. For example, a projector configured with a halogen light, a LED light source, or an LD light source as the light source and with an LCD (Liquid Crystal Display) or a DMD (Digital Micromirror Device) as the optical system can be used as the projector 34. In this case, the optical system is provided over the whole area of the projection area corresponding to pixels, and the optical system is turned on or off by synchronizing the light emitted from the light source with the image, so that the image can be projected over the whole area of the projection area. A projector configured with a light source that emits laser light, and with an optical system that includes a switching element for switching whether the light emitted from the light source is to be transmitted and a mirror for subjecting the light having passed through the switching element to raster scanning can be used as the projector 34. In this case, by changing an angle of the light emitted from the laser light by the mirror and scanning the light irradiated from the light source over the whole area of the projection area, the image can be projected to the projection area.

The acceleration sensor 36 is a detector that detects an acceleration applied to the cabinet 11. As the acceleration sensor 36, a detector that detects an acceleration using various methods can be used. For example, a detector that detects an acceleration based on a change in capacitance, a change in piezo resistance, or a change in relative positions can be used. The acceleration sensor 36 detects an acceleration acting on the cabinet 11 when the operator shakes or moves the cabinet 11. The mobile electronic device 10 is basically configured in the above manner.

Figure 4:
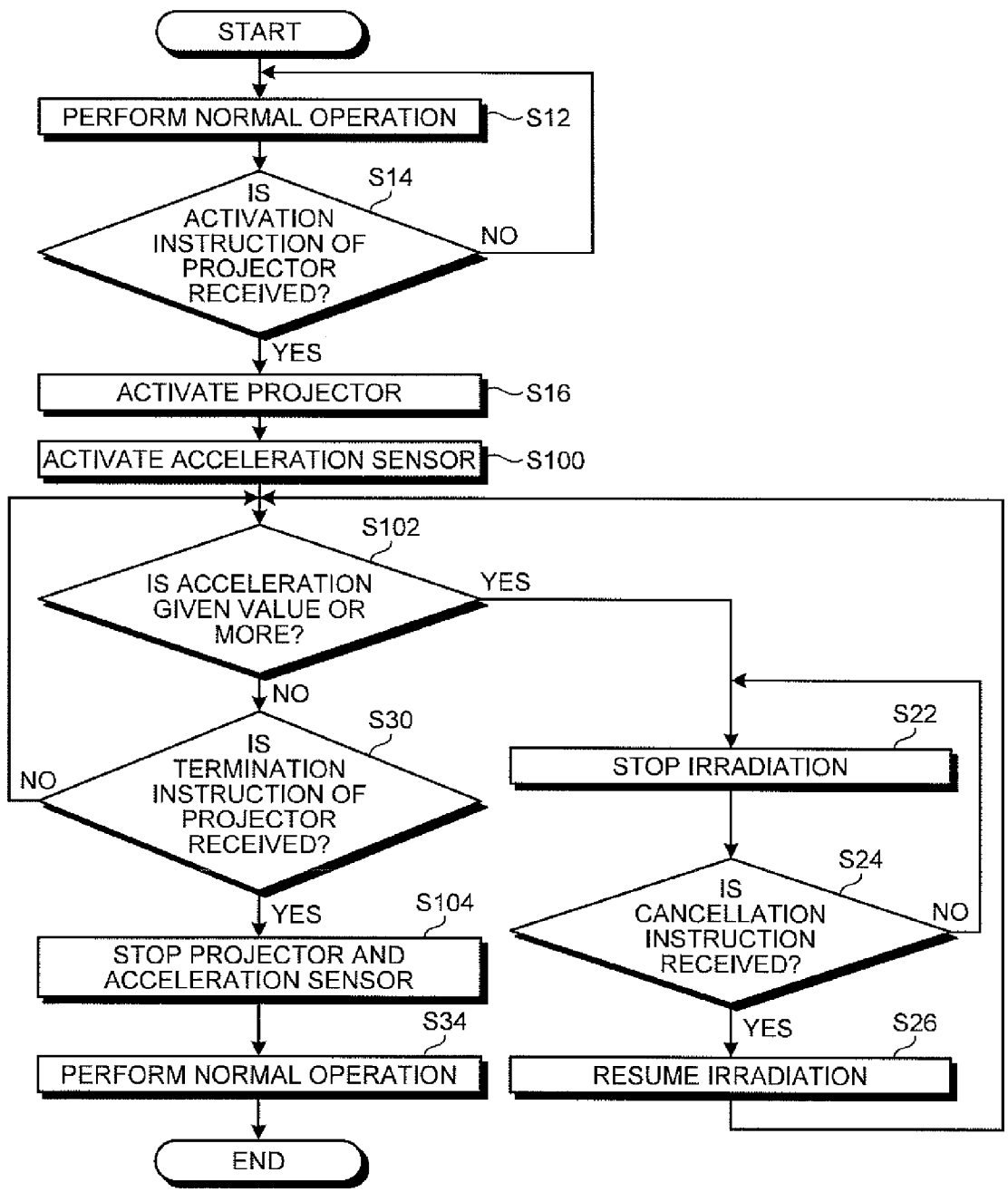
FIG. 4 is a flowchart illustrating one example of the operation of the mobile electronic device.

Next, the operation of the mobile electronic device 10, specifically, the control operation of the projector will be explained with reference to FIG. 4. FIG. 4 is a flowchart illustrating one example of the operation of the mobile electronic device. The flowchart illustrated in FIG. 4 is an example of controlling the operation of the projector 34 using an acceleration sensor 36.

First, the mobile electronic device 10 performs a normal operation as Step S12. The normal operation mentioned here indicates a state where any function, other than the projector 34, such as display of a standby image and telephone-call operation, is used. Then, the control unit 22 of the mobile electronic device 10 determines whether an instruction to activate the projector 34 or an activation instruction is received, as Step S14. When it is determined that the activation instruction of the projector 34 is not received (No), the control unit 22 proceeds to Step S12 and continues the normal operation. In this way, the control unit 22 repeats Step S12 and Step S14 until it is detected that the activation instruction of the projector 34 is received.

When it is determined at Step S14 that the activation instruction of the projector is received, or it is determined that the activation instruction is received (Yes), the control unit 22 activates the projector 34 as Step S16. The control unit 22 reads a task to control the operation of the projector 34 from the storage unit 24, to activate the application program. This leads to irradiation (emission) of light from the projector 34, and an image is projected to the projection area. Next, after activating the projector 34 at Step S16, the control unit 22 activates the acceleration sensor 36 as Step S100.

After activating the acceleration sensor 36 at Step S100, the control unit 22 determines, as Step S102, whether an acceleration of a given value or more is detected. Specifically, if the force is externally applied to the mobile electronic device 10 fixed to a given location and the mobile electronic device 10 is thereby moved, the acceleration sensor 36 detects the movement as an acceleration. The control unit 22 determines whether the acceleration detected by the acceleration sensor 36 is the given value or more. The acceleration of a given value or more mentioned here refers to an acceleration capable of detecting that the mobile electronic device 10 is moved or shaken by the operator. An acceleration higher than an acceleration detected as noise and an acceleration higher than a fine acceleration caused by vibration when a person walks along the ground may be determined as an acceleration of the given value or more.

When it is determined at Step S102 that the acceleration is the given value or more (Yes), the control unit 22 stops irradiation of light from the projector 34 as Step S22. That is, the control unit 22 causes the projector 34 not to project an image. After the irradiation of the light is stopped at Step S22, the control unit 22 determines whether a cancellation instruction is received, as Step S24. When it is determined at Step S24 that the cancellation instruction is not received (No), then the control unit 22 proceeds to Step S22. That is, the control unit 22 repeats Step S22 and Step S24 until the cancellation instruction is received, and repeats determination as to whether the cancellation instruction is received while the irradiation of the light from the projector 34 is stopped. The cancellation instruction is an instruction to cancel the stop of the irradiation or to resume the irradiation. The cancellation instruction is input by the operator.

When it is determined at Step S24 that the cancellation instruction is received (Yes), the control unit 22 resumes the irradiation of the light from the projector 34, as Step S26. That is, the projection of the image is resumed by the projector 34. After the irradiation of the light from the projector 34 is resumed at Step S26, the control unit 22 proceeds to Step S102.

When it is determined at Step S102 that the acceleration is not the given value or more (No) or it is determined that the detected acceleration is less than the given acceleration, the control unit 22 determines, as Step S30, whether an instruction to terminate the drive of the projector 34 or a termination instruction is received. When it is determined at Step S30 that the termination instruction of the projector 34 is not received (No), the control unit 22 proceeds to Step S102, and again determines whether the acceleration is the given value or more. That is, the control unit 22 repeats the operations until the drive of the projector 34 is stopped.

When it is determined at Step S30 that the termination instruction of the projector is received (Yes), the control unit 22 terminates the drive of the projector 34 and the acceleration sensor 36 as Step S104, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 4.

In this way, by controlling the operation of the projector 34 based on the acceleration, it is possible to stop the irradiation of the light emitted from the projector 34 when the external force is applied to the mobile electronic device 10 and its status thereby changes. With this feature, for example, when sensing the danger, the operator flicks or shakes the mobile electronic device 10, so that the irradiation of the light from the projector 34 can be stopped. This enables the operator to stop the irradiation of the light from the projector 34 with a simple operation and a momentary operation and to prevent the light from being irradiated to unspecified positions even if the mobile electronic device 10 is flicked. Moreover, if someone suddenly picks up the mobile electronic device 10 placed on a desk, the irradiation of the light from the projector 34 can be stopped. This makes it possible to prevent the light from being emitted from the projector 34 when the projection area is suddenly changed or when the projection area is displaced by an unexpected operation.

As explained above, when danger is sensed or when an unexpected shock is applied, emission of light can be stopped, and this makes it possible to prevent the light emitted from the projector 34 from entering person's eyes at a close range and to reduce the possibility that the person is dazzled by the emitted light. In addition, the light irradiated from the projector 34 can be made hard to enter the person's eyes at high intensity.

Because the mobile electronic device 10 can automatically stop the irradiation of the light based on the result of detection by the acceleration sensor 36, the operability can also be enhanced. Even in such a case that someone suddenly enters the area, the irradiation of light can be stopped only by giving a shock to the mobile electronic device 10.

Furthermore, when the irradiation of light from the projector is suspended at Step S22, by setting so as not to resume the irradiation of light from the projector until the cancellation instruction is received from the operator, the operator can check the safety and then resume the irradiation. For example, if someone is present around the projection area even if no one is present in the projection area, it can be set so as not to resume the irradiation.

Here, the embodiment is configured to stop the irradiation of light from the projector 34 and not to emit the light from the projector 34, however, the present invention is not limited thereto, and thus the amount of light emitted from the projector 34 may be reduced. In other words, the amount of light emitted from the projector 34 may be decreased. By stopping the emission of the light from the projector 34, when someone comes in the light emission direction of the projector 34, it can be set so that the light is made hard to enter the person's eyes. However, reduction in the amount of light also allows less possibility that the person is dazzled by the emitted light. In other words, by reducing the amount of light and making the light weak, even if the light emitted from the projector 34 enters the person's eyes, the possibility that the person is dazzled by the emitted light can be reduced.

Figure 5:
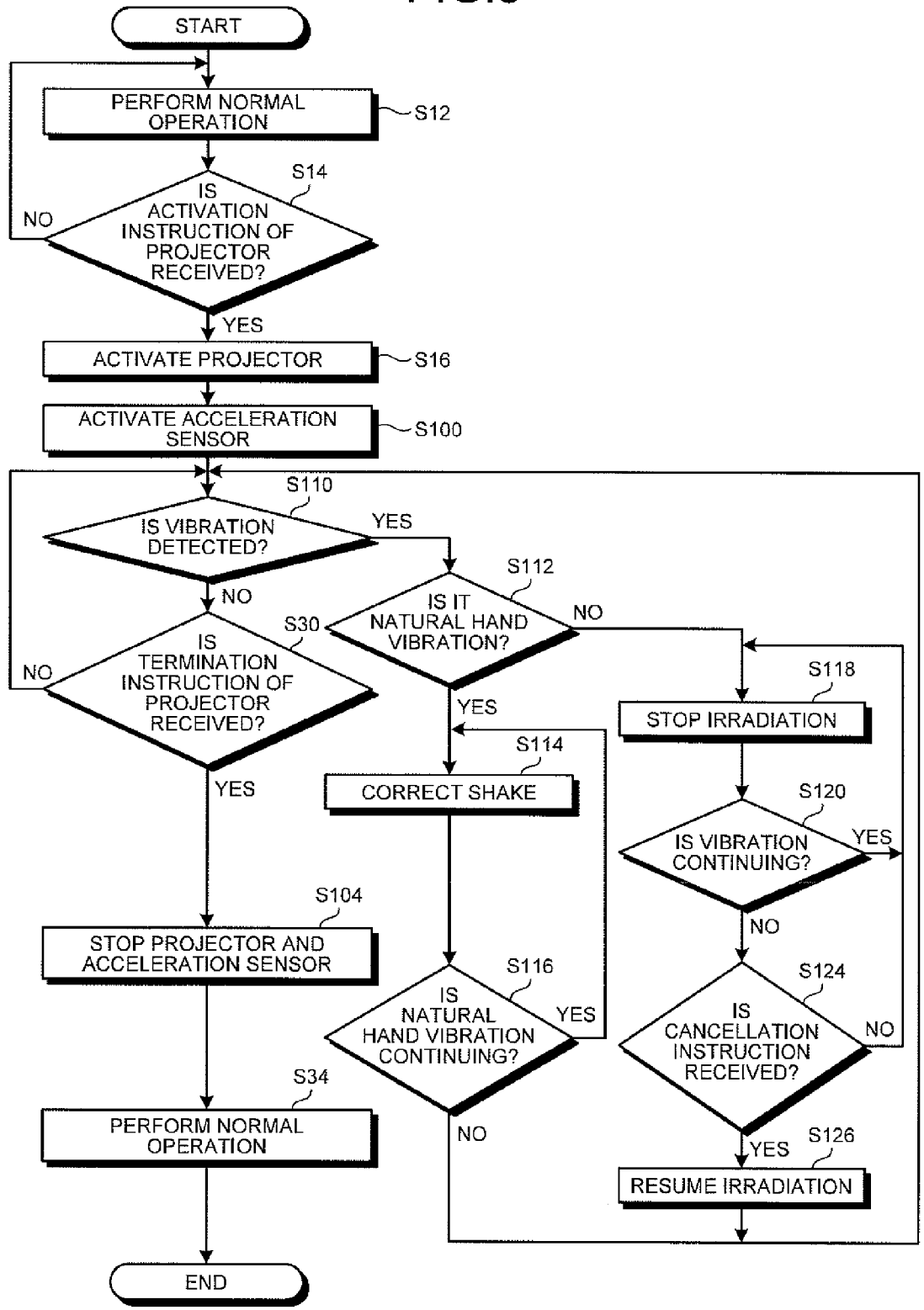
FIG. 5 is a flowchart illustrating another example of the operation of the mobile electronic device.

It is preferable to process a case where the operator uses the projector 34 while holding the mobile electronic device 10 in hand, in the following manner. FIG. 5 is a flowchart illustrating another example of the operation of the mobile electronic device. Here, because the flowchart illustrated in FIG. 5 has portions being the same operations as these in the flowchart illustrated in FIG. 4, detailed explanation of the overlapping portions is omitted, and operations specific to the flowchart illustrated in FIG. 5 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. Next, after activating the projector 34 at Step S16, the control unit 22 activates the acceleration sensor 36 as Step S100.

After activating the acceleration sensor 36 at Step S100, the control unit 22 determines, as Step S110, whether a vibration is detected. That is, the control unit 22 determines whether an acceleration of a given value or more is measured by the acceleration sensor 36. The acceleration of the given value or more mentioned here refers to an acceleration same as the above-explained acceleration of the given value or more.

Next, when it is determined at Step S110 that the vibration is detected (Yes), the control unit 22 determines whether the detected vibration is a natural hand vibration, as Step S112. Here, whether the vibration is the natural hand vibration is determined based on its detected frequency (cycle of acceleration) and amplitude (magnitude of acceleration). As one example, a vibration whose frequency is 10 Hz or less can be determined as the natural hand vibration.

When it is determined at Step S112 that the vibration is the natural hand vibration (Yes), the control unit 22 performs shake correction as Step S114. Specifically, the control unit 22 corrects the shake of an image projected by the projector 34. That is, the control unit 22 causes the projector 34 to project an image to which the measures for the effect of the natural hand vibration are taken. After performing the shake correction at Step S114, the control unit 22 determines whether the natural hand vibration is continuing as Step S116. Specifically, the control unit 22 determines whether a vibration has occurred and the vibration is a natural hand vibration based on the result of measurement by the acceleration sensor 36. When the vibration has occurred and the vibration is the natural hand vibration, the control unit 22 determines that the natural hand vibration is continuing. When the vibration has not occurred or the vibration is not the natural hand vibration, the control unit 22 determines that the natural hand vibration is not continuing.

When it is determined at Step S116 that the natural hand vibration is continuing (Yes), the control unit 22 proceeds to Step S114. That is, the control unit 22 repeats Step S114 and Step S116 while the natural hand vibration is continuing. When it is determined at Step S116 that the natural hand vibration is not continuing (No), the control unit 22 proceeds to Step S110, and determines again whether a vibration is detected.

When it is determined at Step S112 that the vibration is not the natural hand vibration (No), or when it is determined that the vibration is higher than the natural hand vibration, the control unit 22 stops the irradiation of the light from the projector 34 as Step S118. That is, the control unit 22 causes the projector 34 not to project an image. The control unit 22 stops the irradiation of the light at Step S118, and determines whether the vibration is continuing as Step S120. At Step S120, when the vibration higher than the natural hand vibration is detected by the acceleration sensor 36, the control unit 22 determines that the vibration is continuing, while when the vibration higher than the natural hand vibration is not detected, the control unit 22 determines that the vibration is not continuing. When it is determined at Step S120 that the vibration is continuing (Yes), the control unit 22 proceeds to Step S118. That is, the control unit 22 stops the irradiation and repeats Step S118 and Step S120 while the vibration is continuing.

When it is determined at Step S120 that the vibration is not continuing (No), the control unit 22 determines whether a cancellation instruction is received as Step S124. When it is determined at Step S124 that the cancellation instruction is not received (No), the control unit 22 proceeds to Step S118. That is, the control unit 22 repeats from Step S118 to Step S124 until the cancellation instruction is received, and repeats determination as to whether the vibration is continuing or the cancellation instruction is received while the irradiation of light from the projector 34 is stopped. The cancellation instruction is an instruction to cancel the stop of the irradiation or an instruction to resume the irradiation, and is an instruction input by the operator.

When it is determined at Step S124 that the cancellation instruction is received (Yes), the control unit 22 resumes the irradiation of the light from the projector 34 as Step S126. That is, the control unit 22 resumes projection of an image from the projector 34. After the irradiation of light from the projector 34 is resumed at Step S126, the control unit 22 proceeds to Step S110.

When it is determined at Step S110 that the vibration is not detected (No), the control unit 22 determines whether an instruction to terminate the drive of the projector 34 or a termination instruction is received, as Step S30. When it is determined at Step S30 that the termination instruction of the projector is not received (No), then the control unit 22 proceeds to Step S110, and again determines whether a vibration is detected. That is, the control unit 22 repeats the operations until the drive of the projector 34 is stopped. When it is determined at Step S30 that the termination instruction of the projector is received (Yes), the control unit 22 terminates the drive of the projector 34 and the acceleration sensor 36 as Step S104, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 5.

In this way, even when the vibration is detected, by determining whether the detected vibration is natural hand vibration, an image can be projected from the projector 34 even when the operator manipulates the mobile electronic device 10 while holding it. When projection of an image desired to be stopped, by intentionally shaking the mobile electronic device 10, the irradiation of light can be stopped. If the mobile electronic device 10 drops, the irradiation of light is also stopped. This allows operability to be enhanced while safety is highly maintained. In the present embodiment, because a more appropriate image can be displayed, the shake correction is performed, however, the shake correction is not necessarily performed.

As explained above, in each case, when the irradiation of light from the projector 34 is suspended at Step S22 or Step S118, by causing the projector not to resume the irradiation of light until the cancellation instruction is received from the operator, the operator can check the safety and resume it. For example, if someone is present not in the projection area but around the projection area, the mobile electronic device 10 is configured so as not to resume the irradiation. This can lead to further enhancement of the safety.

The embodiment is configured to stop the irradiation of light from the projector 34 and therefore not to emit the light from the projector 34, however, the present invention is not limited thereto, and thus the amount of light emitted from the projector 34 may be reduced. By stopping the emission of the light from the projector 34, when a person comes in the emission direction of the light from the projector 34, the light can be made hard to enter person's eyes. However, even by reducing the amount of light, the possibility that the person is dazzled by the emitted light can be decreased. In other words, by reducing the light amount and decreasing the light, even if the light emitted from the projector 34 may enter person's eyes, the possibility that the person is dazzled by the emitted light can be reduced.

In addition, the embodiment is configured so that the control unit 22 always detects values detected by the acceleration sensor, however, if the operation of the projector can be controlled based on the values detected by the sensor, the process is not limited thereto. For example, when each of the detected values is processed by the sensor separately from the process performed by the control unit and the detected value by the sensor is in a given state, or when the detected value becomes a value which can be determined that an output of the light illuminated from the projector 34 needs to be reduced or stopped, the state is notified to the control unit. When receiving the notification, the control unit may control the operation of the projector.

The embodiment has been explained on the assumption that the mobile electronic device 10 is basically placed on a desk or a chair for use, except for the flowchart in FIG. 5, however, the projector 34 is also used while the operator holds it in hand. Therefore, as a mode to drive the projector 34, it is preferable for the mobile electronic device 10 to have two modes: a mobile mode (first mode) which is assumed that the operator uses the projector 34 while holding the mobile electronic device 10 (cabinet 11) in hand and a stationary mode (second mode) which is assumed that the operator uses the projector 34 while the mobile electronic device 10 (cabinet 11) is placed on a desk, a table, or a charging base. Here, the control in FIG. 4 has to be performed when the stationary mode is activated. In this way, the two modes are provided and switched to each other as required, which enables the operability and the safety to be further enhanced.

Figure 6:
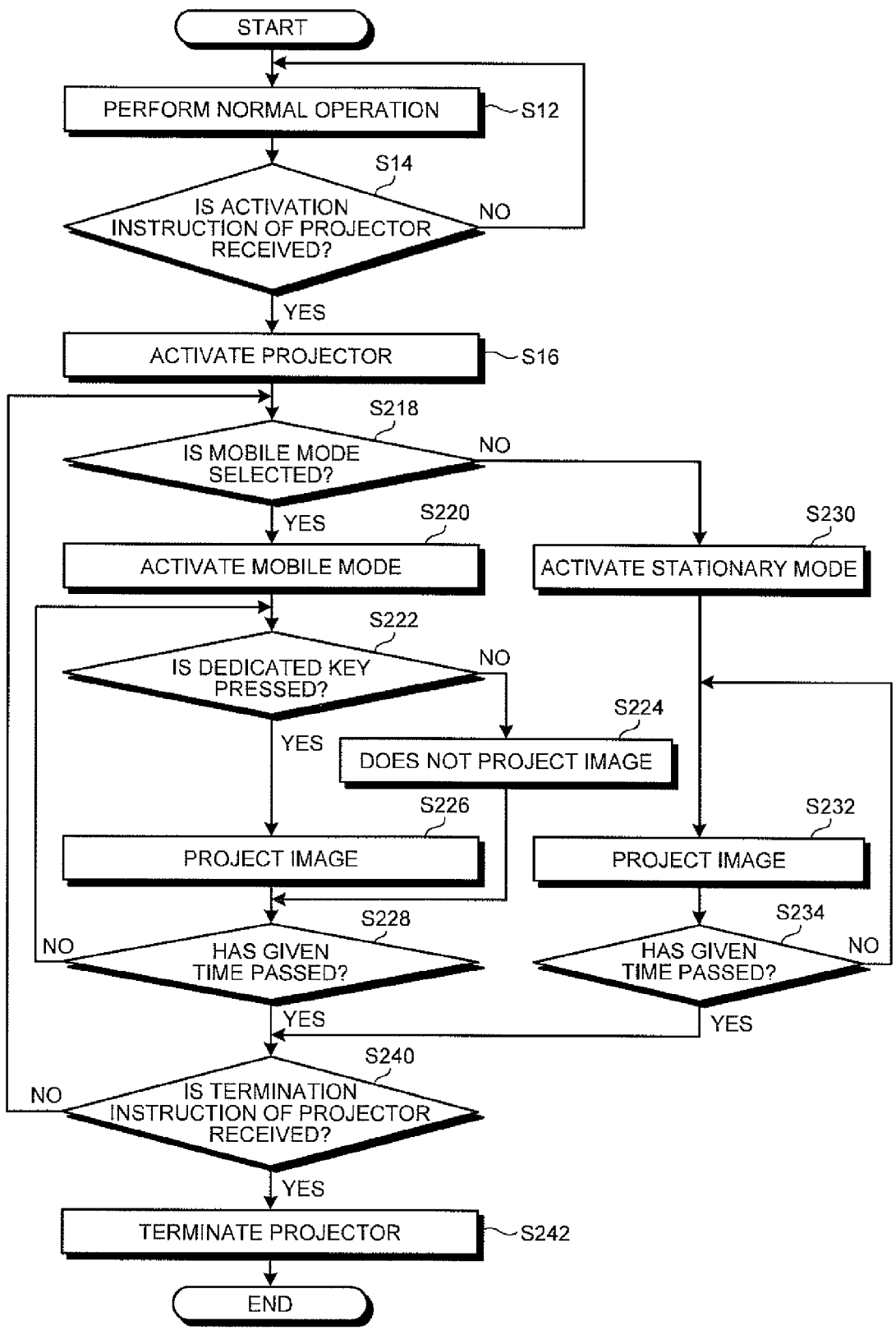
FIG. 6 is a flowchart illustrating another example of the operation of the mobile electronic device.

The operation control for switching between the two modes will be explained in detail below with reference to FIG. 6. FIG. 6 is a flowchart illustrating another example of the operation of the mobile electronic device. Here, because the flowchart illustrated in FIG. 6 has portions being the same operations as these in the flowchart illustrated in FIG. 4, detailed explanation of the overlapping portions is omitted, and operations specific to the flowchart illustrated in FIG. 6 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. Then, after activating the projector 34 at Step S16, the control unit 22 determines whether the mobile mode is selected as Step S218. Control methods of the mobile mode and the stationary mode will be explained below together with their operations. The mobile mode or the stationary mode according to the present embodiment is selected by the operator. As a timing in which the operator selects the mode, it may be selected at a step at which the control unit 22 proceeds to Step S218, or it may be selected as a previous setting when the normal operation is performed before activation of the projector.

When it is determined at Step S218 that the mobile mode is selected (Yes), then the control unit 22 activates the mobile mode as Step S220. After activating the mobile mode at Step S220, the control unit 22 determines whether the dedicated key 14 is pressed as Step S222. When it is determined at Step S222 that the dedicated key 14 is not pressed (No), the control unit 22 causes the projector 34 not to project an image as Step S224. That is, the control unit 22 causes the projector 34 not to emit the light. When it is determined at Step S222 that the dedicated key 14 is pressed (Yes), then the control unit 22 causes the projector 34 to project an image as Step S226. That is, the control unit 22 causes the projector 34 to emit the light.

After controlling whether the image is to be projected at Step S224 or Step S226, the control unit 22 determines whether a given time has passed, as Step S228. At Step S228, when it is determined that the given time has not passed (No), then the control unit 22 proceeds to Step S222, while when it is determined that the given time has passed (Yes), then the control unit 22 proceeds to Step S240. In this manner, the control unit 22 repeats the operations from Step S222 to Step S228 until the given time has passed, and switches between processes as to whether the image is to be projected depending on whether the dedicated key 14 is pressed.

When it is determined at Step S218 that the mobile mode is not selected (No), then the control unit 22 activates the stationary mode as Step S230. After activating the stationary mode at Step S230, the control unit 22 causes the projector 34 to project an image, as Step S232. Here, in the stationary mode, as explained in FIG. 4, the acceleration sensor is activated, and if an acceleration of a given value or more is detected, then irradiation of light from the projector 34 is stopped. As a specific example, the controls from Step S100 to Step S30 illustrated in FIG. 4 are performed. In this case, because Step S30 is equivalent to Step S240, actual operations are these right before Step S30. After causing the projector 34 to project an image at Step S232, the control unit 22 determines whether the given time has passed, as Step S234. At Step S234, when it is determined that the given time has not passed (No), then the control unit 22 proceeds to Step S232, while when it is determined that the given time has passed (Yes), then the control unit 22 proceeds to Step S240. In this manner, the control unit 22 repeats the operations at Step S232 and Step S234 until the given time has passed, and continues to project the image from the projector 34.

When the given time has passed at Step S228 or at Step S234, then the control unit 22 determines whether an instruction to terminate the drive of the projector 34 or a termination instruction is received, as Step S240. When it is determined at Step S240 that the termination instruction of the projector is not received (No), then the control unit 22 proceeds to Step S218, again detects a selected mode, and controls the operation of the projector 34 based on the selected mode. That is, the control unit 22 repeats the operations until the drive of the projector 34 is stopped. When it is determined at Step S240 that the termination instruction of the projector is received (Yes), the control unit 22 terminates the drive of the projector 34 as Step S242, returns the operation to the normal operation, and ends the process. When the operation is returned to the normal operation, the control unit 22 determines again whether the activation instruction of the projector is received. That is, the control unit 22 repeats the operations in the flowchart illustrated in FIG. 6.

As explained above, in the flowchart illustrated in FIG. 6, the two modes, the mobile mode and the stationary mode, can be selected. When the mobile mode is selected, the control unit 22 causes the projector 34 to project an image only when the dedicated key 14 is pressed, while when the stationary mode is selected, the control unit 22 causes the projector 34 to project an image regardless of whether the dedicated key 14 is pressed.

In this way, when a projection position of an image or an irradiation position of light easily changes in such a case that the operator uses the mobile electronic device in hand, the mobile mode is selected and the image is projected only when the dedicated key 14 is pressed, which allows an instant stop of the image projection when a person cuts in the projection area of the image, that is, allows the light irradiation to be stopped. Especially, if the emitted light is irradiated to the person's face, the operator can stop the irradiation of the light only by releasing the dedicated key 14, which allows less possibility that the person is dazzled by the irradiated light. Even if the operator accidentally drops the mobile electronic device, the irradiation of the light is stopped. Therefore, when it is not known to which direction the light is irradiated while it is falling, the possibility of light irradiation can be reduced, which allows less possibility that the person is dazzled by the irradiated light.

In this manner, the operation controls can be switched to one another according to the use condition, and therefore even if the operator uses the mobile electronic device while holding it in hand, the operability can be enhanced while the possibility that the person is irradiated with the light can be further reduced. In other words, the projector 34 can be used with high safety and high operability.

When the projection position of an image is not basically changed in such a case that the mobile electronic device 10 is used while being placed on a desk, a chair, or a table, it is configured to select the stationary mode and project an image, and this enables the image to be projected in a state where the mobile electronic device 10 is placed thereon. In this case also, as explained above, by providing the controls as illustrated in FIG. 4, the possibility that the light emitted from the projector 34 may enter the person's eyes can be reduced, thus enhancing the operability and the safety.

Here, the dedicated key 14 is provided on the side face of the cabinet 11 in the present embodiment, however, the position of the dedicated key 14 is not particularly limited, so that the dedicated key 14 may be provided on the face where the operation keys 13 are provided or may be provided on the bottom face of the cabinet 11. In the embodiment, when the mobile mode is selected, it is configured to project the image only when the dedicated key 14 is pressed, however, the present invention is not limited thereto. Therefore, any key may be used as a key to determine whether the image is to be projected. For example, when a particular key among the operation keys 13 is pressed, the image may be projected, or if any one of the operation keys 13 is pressed, the image may be projected irrespective of any type of keys. In addition, when a touch panel is used instead of the keys, the image may be projected while the operator touches the touch panel.

In the embodiment, it is configured that the operator selects whether the mobile mode is set or the stationary mode is set, however, the present invention is not limited thereto. Therefore, it may be configured that the mobile electronic device 10 detects its conditions and automatically select one of the modes.

For example, the acceleration sensor 36 detects an acceleration acting on the cabinet 11, so that the mode may be selected (switched) based on the detected acceleration. As one example, when the acceleration is not detected or when it can be determined as substantially zero, the control unit 22 sets the stationary mode, and if any case other than this case, the control unit 22 may set the mobile mode. Moreover, when an acceleration of a given value or more (acceleration which can be regarded as a status of holding in hand and is lower than a threshold at which the irradiation of light is stopped) is detected or when an acceleration of a given pattern is detected, the control unit 22 may also set the mobile mode. In this manner, by switching one mode to the other based on the acceleration, an appropriate control mode can be selected without any operation performed by the operator, which enables the operability to be further enhanced while maintaining the safety. In addition, by setting so as to automatically switch between the modes, it is possible to prevent that the stationary mode is selected even though the operator is holding the mobile electronic device 10.

Moreover, the control unit 22 detects a frequency of force and a magnitude of the force (amplitude) from the acceleration acting on the cabinet 11, and may select the mobile mode when the detected values are numerical values which can be determined as natural hand vibration. Specifically, in the flowchart illustrated in FIG. 5, when the control unit 22 proceeds to Step S114, the mode is determined as the mobile mode, while the control unit 22 proceeds to Step S30 and Step S118, the mode may be determined as the stationary mode. In this manner, by determining whether the operator is holding the cabinet based on the natural hand vibration, and this allows discrimination between shaking caused by the operator holding it and any other shaking (e.g., shaking caused by an object hitting a desk), thus further enhancing the operability.

Selection is not limited to the selection between the mobile mode and the stationary mode based on the acceleration detected by the acceleration sensor 36. Therefore, it may be detected whether the mobile electronic device 10 is connected to an external power supply (e.g., AD adaptor) used for charging, and a mode may be selected based on the detected result. As a detector that detects whether the power supply and the mobile electronic device 10 are connected to each other, a detection sensor that detects whether a connection terminal of the mobile electronic device 10 is connected with the power supply and a detection sensor that detects power, voltage and/or current supplied externally to the mobile electronic device 10 can be used.

In the case where the mode is switched to the other based on whether the mobile electronic device 10 is connected to the power supply as above, it can be set so that when it is detected that the mobile electronic device 10 is connected to the power supply, the stationary mode is selected, while when it is not detected that the mobile electronic device 10 is connected to the power supply or when it is detected that the mobile electronic device 10 is not connected to the power supply, then the mobile mode is selected. Consequently, when the mobile electronic device 10 is connected to the power supply (power supply cord) and its movement is restricted, the mode is switched to the stationary mode, while when the movement is not restricted, then the mode is switched to the mobile mode, thus enhancing the safety and the operability.

When the power is to be detected, it is preferably identified whether the power is supplied from a commercial power supply such as a provided outlet or is supplied from a dry-cell battery or from a battery of PC and the like connected thereto through USB, based on supplied power, voltage and/or current. In the case where the power can be identified in this manner, it is preferable to select the stationary mode in the case where the power is supplied from the commercial power supply. This can change the mode to be selected depending on whether it is connected to a freely movable power supply such as a dry-cell battery or it is connected to a commercial power supply in which a movement range is restricted by the cord, thus further enhancing the safety and the operability.

When the mobile electronic device 10 is to be charged, it is detected whether the mobile electronic device 10 is placed on a charging base, and the mode may be selected based on the result of detection. Here, as a detector that detects whether the mobile electronic device 10 is placed on the charging base, a contact detection sensor is simply provided at a contact position of the cabinet 11 with the charging base.

In this way, based on whether the mobile electronic device 10 is placed on the charging base, when the modes are switched to each other, it can be set so as to select the stationary mode if it is detected that the mobile electronic device 10 is placed on the charging base, and to select the mobile mode if it is not detected that the mobile electronic device 10 is placed on the charging base or it is detected that the mobile electronic device 10 is not placed on the charging base. Thus, when the mobile electronic device 10 is placed on the charging base and its movement is restricted, then the mode can be set as the stationary mode, while when its movement is not restricted, then the mode can be set as the mobile mode, thus enhancing the safety and the operability.

Moreover, the present invention is not limited to the case where the mode is determined according to the status of the mobile electronic device 10 or according to whether the mobile electronic device 10 is connected to the power supply, or according to whether it is placed on the charging base.

FIGS. 7A to 7D are explanatory diagrams of one example of controls in the mobile electronic device, or explanatory diagrams illustrating operation patterns. First, the operation pattern as illustrated in FIG. 7A is an operation pattern in which when the mobile electronic device 10 is placed on the charging base and/or is connected to the power supply, the stationary mode can be selected but the mobile mode cannot be selected, while when the mobile electronic device 10 is not placed on the charging base and is not connected to the power supply, the stationary mode cannot be selected but the mobile mode can be selected. In other words, the operation pattern as illustrated in FIG. 15A is the one in which one mode is selected according to the status of the mobile electronic device 10.

The operation pattern illustrated in FIG. 7B is the one in which when the mobile electronic device 10 is placed on the charging base and/or is connected to the power supply, the stationary mode can be selected but the mobile mode cannot be selected, while when the mobile electronic device 10 is not placed on the charging base and is not connected to the power supply, both the stationary mode and the mobile mode can be selected. In the case of this operation pattern, when the mobile electronic device 10 is not placed on the charging base and is not connected to the power supply, the operator can select whether to set the stationary mode or to the mobile mode.

The operation pattern illustrated in FIG. 7C is the one in which when the mobile electronic device 10 is placed on the charging base and/or is connected to the power supply, both the stationary mode and the mobile mode can be selected, while when the mobile electronic device 10 is not placed on the charging base and is not connected to the power supply, the stationary mode cannot be selected but the mobile mode can be selected. In the case of this operation pattern, when the mobile electronic device 10 is placed on the charging base and/or is connected to the power supply, the operator can select whether to set the stationary mode or to set the mobile mode.

The operation pattern illustrated in FIG. 7D is the one in which in both the cases where the mobile electronic device 10 is placed on the charging base and/or is connected to the power supply and where the mobile electronic device 10 is not placed on the charging base and is not connected to the power supply, both the stationary mode and the mobile mode can be selected. In the case of this operation pattern, the operator can select whether to set the stationary mode or to set the mobile mode in both of the cases.

In this way, as any one of the four operation patterns as illustrated in FIG. 15A to FIG. 15D, two modes can be selected, thus enhancing the safety and the operability. Moreover, the operator may set one operation pattern of the four operation patterns, or may store only one operation pattern of the four operation patterns as an application program in the mobile electronic device 10.

Figure 8:
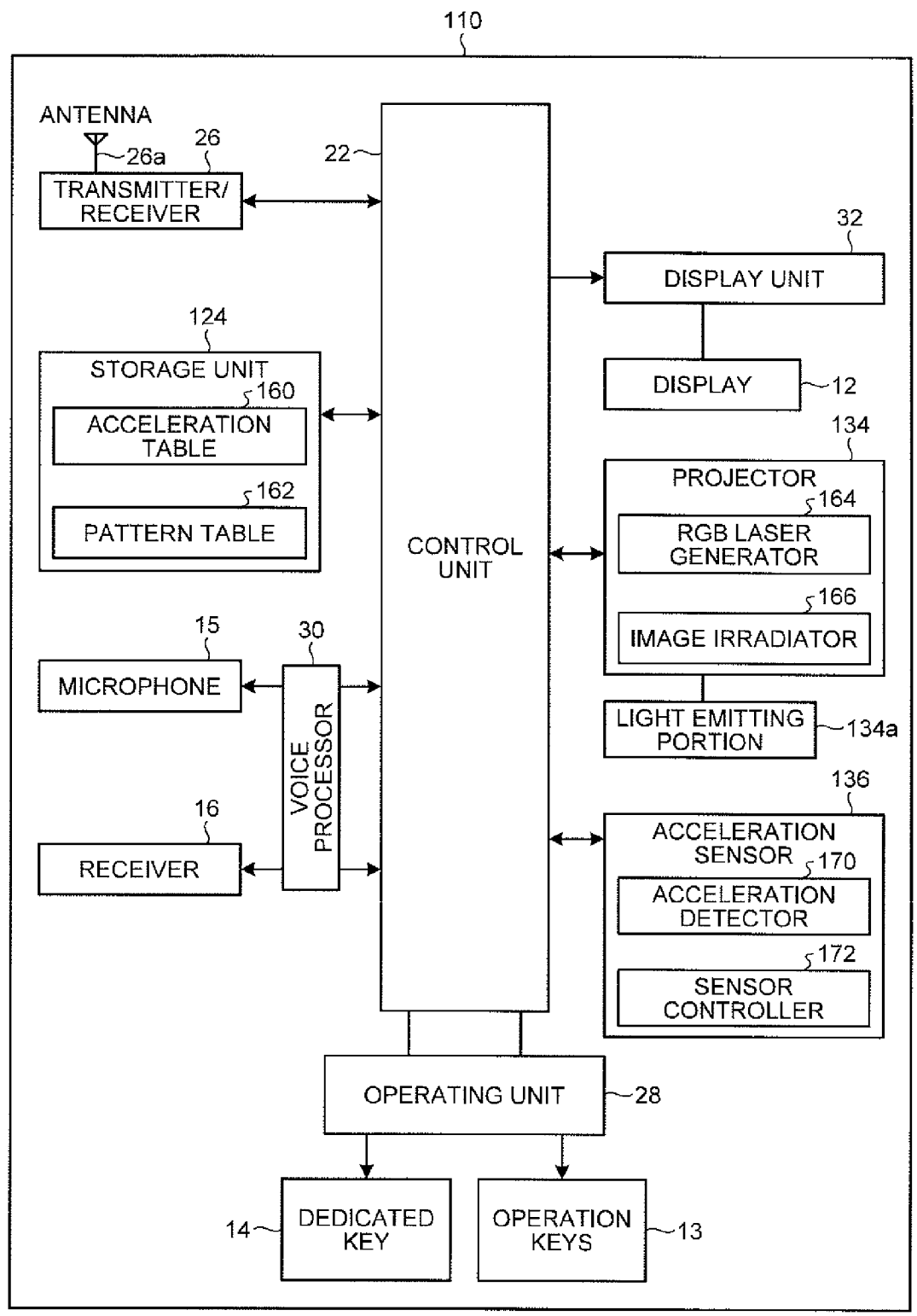
FIG. 8 is a block diagram of a schematic configuration of another embodiment of the mobile electronic device.
Figure 9:
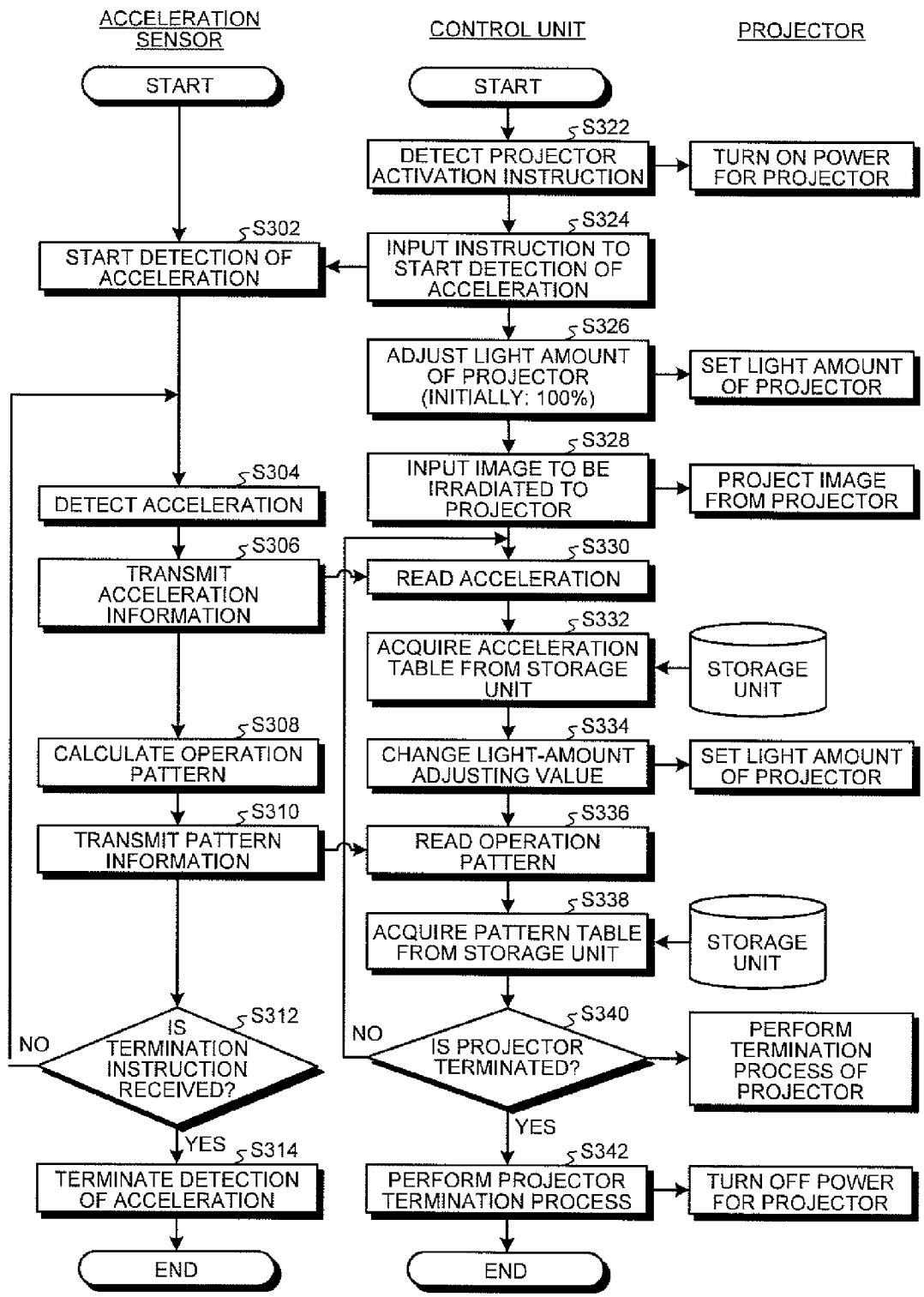
FIG. 9 is a flowchart illustrating one example of the operation of the mobile electronic device illustrated in FIG. 8.

Here, the embodiment is configured to stop the emission of light from the projector 34 or to reduce the light amount when the acceleration detected by the acceleration sensor 36 becomes an acceleration of a given value or more. However, it may be configured to adjust the light amount to various light amounts according to the detected value of acceleration and/or the pattern of the acceleration. The adjustment will be explained in detail below with reference to FIG. 8 and FIG. 9. FIG. 8 is a block diagram of a schematic configuration of another embodiment of the mobile electronic device, and FIG. 9 is a flowchart illustrating one example of the operation of the mobile electronic device illustrated in FIG. 8. A mobile electronic device 110 illustrated in FIG. 8 is configured in the same manner as that of the mobile electronic device 10 illustrated in FIG. 2, except for a storage unit 124, a projector 134, and an acceleration sensor 136, each in which its partial configuration is made more specific. Therefore, detailed explanation of the same components as these of the mobile electronic device 10 are omitted in the following explanation, and points specific to the mobile electronic device 110 will be mainly explained.

As illustrated in FIG. 8, the mobile electronic device 110 includes the control unit 22, the storage unit 124, the transmitter/receiver 26, the operating unit 28, the voice processor 30, the display unit 32, the projector 134, and the acceleration sensor 136. Because the control unit 22, the transmitter/receiver 26, the operating unit 28, the voice processor 30, and the display unit 32 are configured in the same manner as these units of the mobile electronic device 10, detailed explanation thereof is omitted.

First, the storage unit 124 stores therein various tasks, software, and data similarly to the storage unit 24. The storage unit 124 further stores therein an acceleration table 160 and a pattern table 162. The acceleration table 160 and the pattern table 162 are tables that store therein a correspondence between a detected value and a control condition for use when the operation of the projector 134 is controlled based on the detected value detected by the acceleration sensor 136. The acceleration table 160 stores therein a correspondence between an acceleration and a control condition. The pattern table 162 stores therein a correspondence between an operation pattern detected from an acceleration and a control condition.

The projector 134 is an image projection system for projecting an image, and is provided with a light emitting portion 134a for projecting an image, on the top face of the cabinet 11 as explained above. The projector 134 according to the present embodiment includes an RGB laser generator 164 and an image irradiator 166.

The RGB laser generator 164 is a light source that emits the light. The RGB laser generator 164 is formed with a light source that emits R (red) light, light source that emits G (green) light, and a light source that emits B (blue) light. Here, a semiconductor laser or the like can be used as the light source. The RGB laser generator 164 also includes an optical system for causing light emitted from each of the light sources to enter a predetermined position of the image irradiator 166 at a predetermined angle.

The image irradiator 166 switches between processes as to whether light is to be irradiated by coinciding with an image to be projected while changing an angle of light emitted from the RGB laser generator 164 and scanning a position where the light within the projection area reaches. The light having passed through the image irradiator 166 is emitted toward the projection area from the light emitting portion 134a. Here, when 30 images per second are to be projected, the image irradiator 166 switches from one position to another where each light emitted from the RGB laser generator 164 is projected so that each of the R, G, and B lights scans the whole surface of the projection area in 1/30 seconds.

The projector 134 is configured in the above manner. The projector 134 projects an image to the projection area in such a manner that the image irradiator 166 controls the light emitted from the RGB laser generator 164 according to the image to be projected and the light having passed through the image irradiator 166 is projected through the light emitting portion 134a.

The acceleration sensor 136 includes an acceleration detector 170 and a sensor controller 172. The acceleration detector 170 is a detector that detects an acceleration applied to the cabinet 11. As the acceleration detector 170, for example, a detector that detects an acceleration based on a change in capacitance, a change in piezo resistance, or a change in relative positions can be used as explained above. The acceleration detector 170 detects an acceleration acting on the cabinet 11 when the operator shakes or moves the cabinet 11. The sensor controller 172 transmits a detected value, or a value of an acceleration, detected by the acceleration detector 170 to the control unit 22. The sensor controller 172 analyzes a pattern of the detected value detected by the acceleration detector 170 to detect an operation pattern, and transmits the detected operation pattern also to the control unit 22. Here, as an operation pattern detected by the sensor controller 172, a free-fall pattern, a walking pattern, a tapping pattern, and a normal operation pattern are exemplified. The free-fall pattern is a pattern detected when an acceleration from which it can be determined that the mobile electronic device 110 (cabinet 11) is falling, for example, an acceleration close to the gravity in one direction is detected. The walking pattern is a pattern detected when an acceleration from which it can be determined that the operator is walking, for example, an acceleration of a given level is repeatedly increased or decreased in a given time. The tapping pattern is a pattern detected when an acceleration from which it can be determined that the cabinet 11 is tapped by the operator, for example, an acceleration of a given range of magnitude applied to the cabinet 11 in a short time is detected. The normal operation pattern is a pattern detected when it does not correspond to any one of the patterns or when it is used for the normal operation. The mobile electronic device 110 is configured basically in the above manner.

Next, the operation of the mobile electronic device 110, specifically, the control operation of the projector will be explained with reference to FIG. 9. FIG. 9 represents a flow illustrating the operation of the acceleration sensor 136, a flow illustrating the operation of the control unit 22, and an operation of the projector 134, and also represents exchanges of instructions and information between the devices.

First, the operation of the acceleration sensor 136 is explained. When receiving an instruction to start detection of an acceleration from the control unit 22, the acceleration sensor 136 starts to detect an acceleration as Step S302, and detects an acceleration as Step S304. Thereafter, after detecting the acceleration at Step S304, the acceleration sensor 136 transmits the information about the detected acceleration (hereinafter, "acceleration information") to the control unit 22 as Step S306.

After transmitting the acceleration information to the control unit 22 at Step S306, the acceleration sensor 136 analyzes the detected acceleration information and performs pattern calculation for calculating an operation pattern. Specifically, the acceleration sensor 136 calculates which of the free-fall pattern, the walking pattern, the tapping pattern, and the normal operation pattern the acceleration pattern is, based on the detected acceleration information for the given time. After performing the pattern calculation at Step S308, the acceleration sensor 136 transmits calculated operation pattern information (hereinafter, "pattern information") to the control unit 22 as Step S310.

After transmitting the pattern information at Step S310, the acceleration sensor 136 determines whether a termination instruction is received as Step S312. The termination instruction is received from the control unit 22. When it is determined at Step S312 that the termination instruction is received (Yes), the acceleration sensor 136 proceeds to Step S314. The acceleration sensor 136 proceeds to Step S304 when it is determined that no termination instruction is received (No). That is, the acceleration sensor 136 repeats the detection of the acceleration and the detection of the operation pattern until it is detected that the termination instruction is received. When it is determined at Step S312 that the termination instruction is received, the acceleration sensor 136 terminates the detection of the acceleration and the detection of the operation pattern as Step S314, and ends the process. That is, the drive of the acceleration sensor 136 is stopped and the process is ended.

Next, the operation of the control unit 22 and the operation of the projector 134 operating based on the control by the control unit 22 will be explained below. First, when detecting a projector activation instruction as Step S322, that is, when it is detected that a start-up instruction of the projector is received through the operation by the operator, the control unit 22 turns on the power for the projector 134. That is, the control unit 22 activates the projector 134. After detecting the projector activation instruction at Step S322 and activating the projector 134, the control unit 22 inputs an acceleration-detection start instruction, as Step S324. Specifically, the control unit 22 inputs an instruction to start detection of an acceleration to the acceleration sensor 136.

After inputting the acceleration-detection start instruction at Step S324, the control unit 22 adjusts the amount of light emitted from the projector 134, as Step S326. Here, the initial set value of light amount upon activation is set to 100%. That is, it is set so that the set light amount is emitted as it is without reducing the light amount. Next, after adjusting the light amount at Step S326, the control unit 22 inputs an irradiation image to the projector 134 as Step S328. That is, the control unit 22 transmits an image signal to be projected (or image information) to the projector 134. This causes the light to be emitted from the projector 134, and image projection is thereby started.

When the image projection is started by the projector 134 at Step S328, the control unit 22 reads the acceleration at Step S330. That is, the control unit 22 acquires the acceleration information transmitted by the acceleration sensor 136 at Step S306. After acquiring the acceleration information at Step S330, the control unit 22 acquires the acceleration table 160 from the storage unit 124, as Step S332. Here, the acceleration table 160 stores therein, for example, a correspondence represented in the following Table 1.

TABLE 1

| Acceleration [G] | Light amount[%] |
|---|---|
| 0-0.5 | 100 |
| 0.5-1 | 70 |
| 1-2 | 50 |
| 2-3 | 20 |

The correspondence represented in Table 1 is as follows. When the detected value by the acceleration sensor 136 is 0 G-0.5 G, that is, 0 G or more and less than 0.5 G, the light amount is set to 100% or a value at witch the light is emitted without change from the set value. When the detected value is 0.5 G-1 G, that is, 0.5 G or more and less than 1 G, the light amount is set to 70% or a value at witch the light is reduced by 30% from the set value. When the detected value is 1 G-2 G, that is, 1 G or more and less than 2 G, the light amount is set to 50% or a value at witch the light is reduced by 50% from the set value. When the detected value is 3 G or more, the light amount is set to 0% or a value at witch the light is reduced by 80% from the set value. When the detected value is 2 G-3 G, that is, 2 G or more and less than 3 G, the light amount is set to 20% or a value at witch the emission of the light from the projector 134 is stopped. It is assumed that the detected values by the acceleration sensor 136 are weight-corrected. That is, the value, detected when only the gravity is acting on the mobile electronic device, for example, detected when the mobile electronic device is placed on a desk, is set as 0 G.

After acquiring the acceleration table at Step S332, the control unit 22 calculates a set value of the light amount and changes the light-amount adjusting value, as Step S334, based on the acquired correspondence stored in the acceleration table and the acceleration information acquired at Step S330. For example, the control unit 22 calculates a set value such that the light amount is reduced to 70% if the detected acceleration is 0.8 G, and calculates a set value such that the light amount is reduced to 50% if the detected acceleration is 1.3. After calculating the set value of the light amount, the control unit 22 changes the setting of the light amount of the projector 134 (light-amount adjusting value) based on the calculated set value.

After changing the light-amount adjusting value at Step S334, the control unit 22 reads the operation pattern as Step S336. That is, the control unit 22 acquires information about the operation pattern transmitted by the acceleration sensor 136 at Step S310. After acquiring the operation pattern at Step S336, the control unit 22 acquires the pattern table 162 from the storage unit 124, as Step S338. Here, the pattern table 162 stores therein, for example, a correspondence as represented in the following Table 2.

TABLE 2

| Pattern | Control |
|---|---|
| Normal | No change |
| Free fall | Stop |
| Walking | Stop |
| Tapping | 50% |

The correspondence as represented in Table 2 is as follows. When the pattern detected by the acceleration sensor 136 is the normal pattern, it is determined that there is no change in the light amount. When the pattern detected by the acceleration sensor 136 is the free-fall pattern, the emission of light from the projector 134 is stopped. When the pattern detected by the acceleration sensor 136 is the walking pattern, the emission of light from the projector 134 is also stopped. When the pattern detected by the acceleration sensor 136 is the tapping pattern, the amount of light emitted from the projector 134 is reduced to 50% or reduced by 50% from the set value for emission.

The control unit 22 updates the set value of the light amount and the control operation based on the correspondence stored in the acquired pattern table and the operation pattern acquired at Step S336. After acquiring the pattern table 162 at Step S338 and updating the set value of the light amount and the control operation, the control unit 22 determines whether the image projection by the projector 134 is terminated as Step S340. The control unit 22 determines whether the image projection is terminated, based on whether the termination instruction is received. Here, the termination instruction is received through an operation by the operator, is received when no image to be projected remains, or is received when the remaining amount of a battery becomes a given value or less. When it is determined at Step S340 that the projector 134 is terminated (Yes), the control unit 22 terminates the drive of the projector 134 as Step S342, turns off the power for the projector 134, and, thereafter, ends the process. When it is determined at Step S340 that the projector 134 is not terminated (No), the control unit 22 proceeds to Step S330, and repeats processes from Step S330 to Step S340. When the processes are repeated in this manner, the light amount is adjusted at Step S334 based on the set value of the light amount and the control operation updated at Step S338. That is, when it is determined that the operation pattern is the walking pattern, the emission of light from the projector 134 is stopped at Step S334 regardless of settings at Step S330 and Step S332. The mobile electronic device 110 operates in the above manner.

In this way, by adjusting the amount of light emitted from the projector according to the acceleration detected by the acceleration sensor, an appropriate amount of light can be emitted according to the status of the mobile electronic device 110. This allows the control in such a manner that the amount of light to be emitted is reduced according to increased possibility that the light may enter person's eyes caused by sudden change of the irradiation position, thus further enhancing the safety and the operability. For example, when the mobile electronic device 110 is smoothly moved in order to adjust the position of a projection area, the light amount can be reduced a little, while when it moves suddenly, then the light amount can be largely reduced.

The operation pattern is detected by the acceleration sensor and the amount of light emitted from the projector is adjusted according to the operation pattern, so that an appropriate amount of light can be emitted according to the status of the mobile electronic device 110. The mobile electronic device 110 detects statuses such as walking during which it is not generally assumed that the projector 134 is used, falling of the mobile electronic device 110. Then the mobile electronic device 110 adjusts the light amount according to the status. This allows the mobile electronic device 110 to detect a more appropriate amount of light from the projector. With this feature, even when an irradiation direction of light cannot be predicted, the emission of light can be stopped, the light emitted from the projector 134 can be prevented from entering person's eyes at a close range, and the possibility that the person is dazzled by the emitted light can be reduced. In addition, the light irradiated from the projector 134 can be made hard to enter person's eye at high intensity. By stopping the emission of light during walking, even if the operation key is pressed and the projector is erroneously driven when the mobile electronic device is in his/her pocket or bag, it is possible to set so as not to irradiate the light.

By detecting how the mobile electronic device is tapped and adjusting the light amount based on the tapping, the light amount can be easily adjusted only by tapping the mobile electronic device 110 without operating the operation keys.

A given time is required to detect the operation pattern, and therefore a more appropriate light amount can be set in short time so as to adjust the light amount based on the result of detection of the acceleration without waiting for calculation of the operation pattern. For example, when the operator is walking, the light amount can be reduced, before the walking pattern is detected, based on the result of detection of the acceleration applied caused by the walking. This enables the light amount to be appropriately adjusted even in a short period of time until the operation pattern is detected.

The embodiment is configured to set the light amount to 50% when the tapping pattern is detected as the operation pattern, however, the light amount is not limited thereto. Therefore, the light amount may be changed each time the tapping pattern is detected or each number of tapping times. Alternatively, the emission of light from the projector 134 may be stopped by one tapping. In addition, the acceleration table represented in Table 1 and the pattern table represented in Table 2 are only examples, and thus, the light amount and the control condition are not particularly limited.

Figure 10:
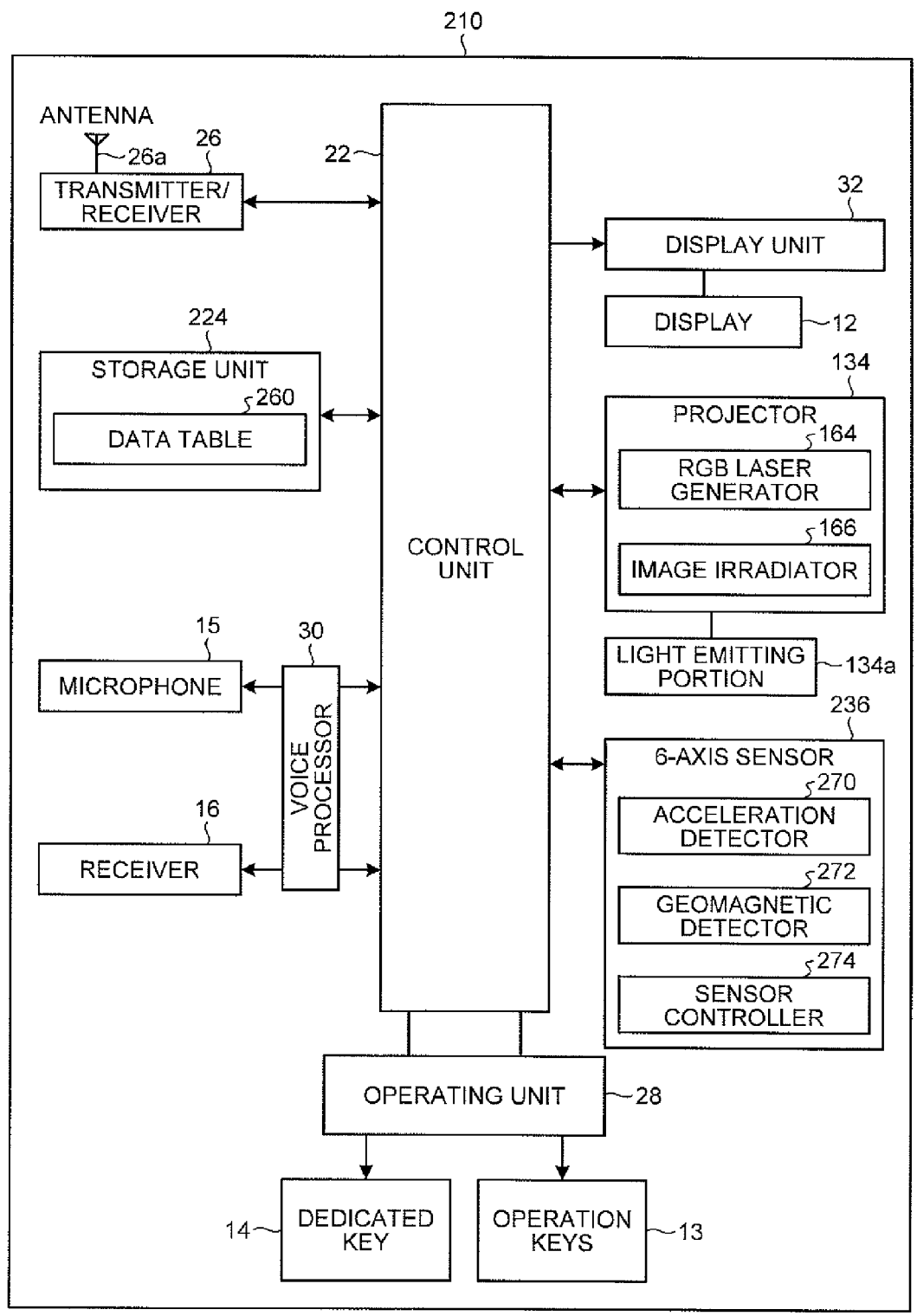
FIG. 10 is a block diagram of a schematic configuration of another embodiment of the mobile electronic device.
Figure 11:
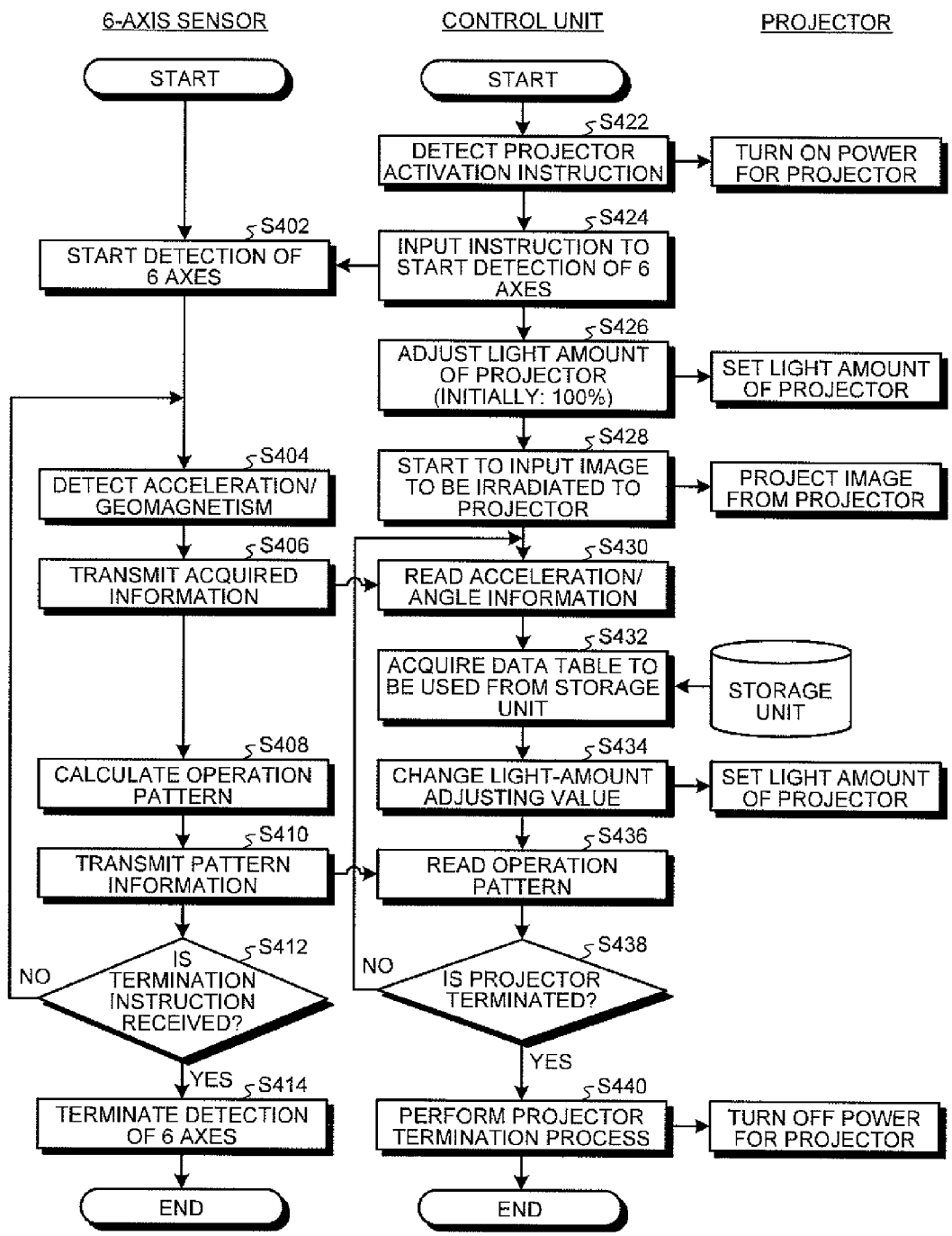
FIG. 11 is a flowchart illustrating one example of the operation of the mobile electronic device illustrated in FIG. 10.

The embodiment has explained the case where the acceleration sensor 136 for detecting only an acceleration is used as the sensor, however, the present invention is not limited thereto. For example, a 6-axis sensor including a geomagnetic detector for detecting a direction of geomagnetism may be used as a sensor, in addition to the acceleration detector for detecting an acceleration. The 6-axis sensor will be explained in detail below with reference to FIG. 10 and FIG. 11. FIG. 10 is a block diagram of a schematic configuration of another embodiment of the mobile electronic device, and FIG. 11 is a flowchart illustrating one example of the operation of the mobile electronic device illustrated in FIG. 10. A mobile electronic device 210 illustrated in FIG. 10 is configured in the same manner as that of the mobile electronic device 110 illustrated in FIG. 8, except for a storage unit 224 and a 6-axis sensor 236, each in which its partial configuration is made more specific. Therefore, detailed explanation of the same components as these of the mobile electronic device 110 are omitted in the following explanation, and points specific to the mobile electronic device 210 will be mainly explained.

As illustrated in FIG. 10, the mobile electronic device 210 includes the control unit 22, the storage unit 224, the transmitter/receiver 26, the operating unit 28, the voice processor 30, the display unit 32, the projector 134, and the 6-axis sensor 236. Because the control unit 22, the transmitter/receiver 26, the operating unit 28, the voice processor 30, the display, unit 32, and the projector 134 are configured in the same manner as these units of the mobile electronic device 110, detailed explanation thereof is omitted.

First, the storage unit 224 stores therein various tasks, software, and data, similarly to the storage unit 24. The storage unit 224 further stores therein a data table 260. The data table is a table that stores therein a correspondence between a detected value and control conditions for use when the operation of the projector 134 is controlled based on the value detected by the 6-axis sensor 236.

The 6-axis sensor 236 includes an acceleration detector 270, a geomagnetic detector 272, and a sensor controller 274. The acceleration detector 270 is detector that detects an acceleration applied to the cabinet 11, similarly to the acceleration detector 170. As the acceleration detector 270, for example, a detector that detects an acceleration based on a change in capacitance, a change in piezo resistance, or a change in relative positions can be used as explained above. The acceleration detector 270 detects an acceleration acting on the cabinet 11 when the operator shakes or moves the cabinet 11. In addition, the acceleration detector 270 detects accelerations in three directions which are mutually orthogonal to each other, or accelerations in 3-axis direction.

The geomagnetic detector 272 is a detector that detects a direction of geomagnetism in the three directions mutually orthogonal to each other. As a detector for detecting geomagnetism, a hall element, an MR (magneto-resistive element) element, an MI (magneto-impedance element) element, a fluxgate element, or the like can be used. The geomagnetic detector 272 transmits detected results of detecting the direction of geomagnetism in the three directions to the sensor controller 274. In this way, the 6-axis sensor 236 detects the accelerations in the three directions and detects axes of earth in the three directions, to thereby acquire six detected values, or to detect 6 axes.

The sensor controller 274 transmits the detected values detected by the acceleration detector 270 or the values of accelerations to the control unit 22. The sensor controller 274 detects the direction of the mobile electronic device 210 (cabinet 11) based on the directions of geomagnetism in the three directions detected by the geomagnetic detector 272, and transmits the information about the detected direction to the control unit 22. Moreover, the sensor controller 274 analyzes patterns of the detected values detected by the acceleration detector 270 and of the detected values detected by the geomagnetic detector 272, detects the operation pattern, and transmits the detected operation pattern to the control unit 22. Here, as the operation pattern detected by the sensor controller 274, similarly to the sensor controller 172, the free-fall pattern, the walking pattern, the tapping pattern, and the normal operation pattern are exemplified. The mobile electronic device 210 is configured basically in the above manner.

Next, the operation of the mobile electronic device 210, specifically, the control operation of the projector will be explained with reference to FIG. 11. FIG. 11 represents a flow illustrating the operation of the 6-axis sensor, a flow illustrating the operation of the control unit 22, and an operation of the projector 134, and also represents exchanges of instructions and information between the devices.

First, the operation of the 6-axis sensor 236 is explained. When receiving an instruction to start detection of 6 axes from the control unit 22, the 6-axis sensor 236 starts to detect an acceleration and geomagnetism as Step S402, and detects the acceleration and a direction of the geomagnetism as Step S404. The 6-axis sensor 236 detects an angle of the mobile electronic device 210 or its direction from the value of the detected geomagnetism. After detecting the acceleration and the direction of the mobile electronic device 210 at Step S404, the 6-axis sensor 236 transmits information about the detected acceleration (hereinafter, "acceleration information") and information for the detected angle of the mobile electronic device about (hereinafter, "angle information") to the control unit 22 as Step S406.

After transmitting the acceleration information and the angle information at Step S406, the 6-axis sensor 236 analyzes the detected acceleration information and angle information to perform pattern calculation for calculating the operation pattern as Step S408. Specifically, the 6-axis sensor 236 calculates whether the acceleration and angle pattern correspond to a holding in hand+non-walking pattern or a stationary pattern based on the detected acceleration information for a given time. It is determined as the stationary pattern when an angle variation is a given value or less and an acceleration is a given value or less. It is determined as the holding in hand+non-walking pattern when the acceleration is 0.2 G or less, the angle variation in the horizontal direction is within ±30 degrees, and the angle variation in the vertical direction is ±45 degrees or less and when the change in a given status is continuing and this does not correspond to the walking pattern. After performing the pattern calculation at Step S408, the 6-axis sensor 236 transmits the information for the calculated operation pattern (hereinafter, "pattern information") to the control unit 22 as Step S410.

After transmitting the pattern information at Step S410, the 6-axis sensor 236 determines whether a termination instruction is received as Step S412. The termination instruction is received from the control unit 22. At Step S412, when it is determined that the termination instruction is received (Yes), the 6-axis sensor 236 proceeds to Step S414, while when it is determined that the termination instruction is not received (No), the 6-axis sensor 236 proceeds to Step S404. That is, the 6-axis sensor 236 also repeats detection of the acceleration, detection of the angle, and detection of the operation pattern until it is detected that the termination instruction is received. When it is determined at Step S412 that the termination instruction is received, the 6-axis sensor 236 terminates the detection of the acceleration, the detection of the angle, and the detection of the operation pattern as Step S414, and ends the process. That is, the drive of the 6-axis sensor 236 is stopped, and the process is ended.

Next, the operation of the control unit 22 and the operation of the projector 134 operating based on the control by the control unit 22 will be explained below. First, when detecting a projector activation instruction as Step S422, that is, when it is detected that a start-up instruction of the projector is received through the operation by the operator, the control unit 22 turns on the power for the projector 134. That is, the control unit 22 activates the projector 134. After detecting the projector activation instruction at Step S422 and activating the projector 134, the control unit 22 inputs a 6-axis detection start instruction, as Step S424. Specifically, the control unit 22 inputs an instruction to start detection of an acceleration and geomagnetism to the 6-axis sensor 236.

After inputting the 6-axis detection start instruction at Step S424, the control unit 22 adjusts the amount of light emitted from the projector 134, as Step S426. Here, the initial set value of light amount upon activation is set to 100%. That is, it is set so that the set light amount is emitted as it is without reducing the light amount. Next, after adjusting the light amount at Step S426, the control unit 22 inputs an irradiation image to the projector 134 as Step S428. That is, the control unit 22 transmits an image signal to be projected (or image information) to the projector 134. This causes the light to be emitted from the projector 134, and image projection is thereby started.

When the image projection is started by the projector 134 at Step S428, the control unit 22 reads the acceleration information and the angle information at Step S430. That is, the control unit 22 acquires the acceleration information and the angle information transmitted by the 6-axis sensor 236 at Step S406. After acquiring the acceleration information and the angle information at Step S430, the control unit 22 acquires the data table 260 from the storage unit 224, as Step S432. Here, the data table 260 stores therein, for example, a correspondence represented in the following Table 3. The data table illustrated in Table 3 is one example, and therefore the light amount and the control condition are not particularly limited.

TABLE 3

| Status number | Last pattern | Acceleration [G] | Vertical angle variation [°] | Horizontal angle variation [°] | Duration time [s] | Determination on operation | Light intensity |
|---|---|---|---|---|---|---|---|
| 1 | Stationary | 0-1 | Within ±15 | Within ±30 | 0.5 or more | Small movement + no rotation | No change |
| 2 | Stationary | 0-1 | Within ±15 | Beyond ±30 | 0.5 or more | Small movement + vertical rotation | 30%-60% |
| 3 | Stationary | 0-1 | Beyond ±15 | Within ±30 | 0.5 or more | Small movement + horizontal rotation | 10%-30% |
| 4 | Stationary | 0-1 | Beyond ±15 | Beyond ±30 | 0.5 or more | Small movement + horizontal/vertical rotation | 10%-30% |
| 5 | Stationary | Beyond 1 | Within ±15 | Within ±30 | 0.5 or more | Large movement + no rotation | 30%-60% |
| 6 | Stationary | Beyond 1 | Within ±15 | Beyond ±30 | 0.5 or more | Large movement + horizontal rotation | 0%-30% |
| 7 | Stationary | Beyond 1 | Beyond ±15 | Within ±30 | 0.5 or more | Large movement + vertical rotation | Stop |
| 8 | Stationary | Beyond 1 | Beyond ±15 | Beyond ±30 | 0.5 or more | Large movement + horizontal/vertical rotation | Stop |

TABLE 3-continued

| Status number | Last pattern | Acceleration [G] | Vertical angle variation [°] | Horizontal angle variation [°] | Duration time [s] | Determination on operation | Light intensity |
|---|---|---|---|---|---|---|---|
| 9 | Stationary | Beyond 1 | Within ±15 | Within ±30 | 0.2 or less | Tapping | Stop |
| 10 | Holding in hand + non-walking | 0-1 | Within ±30 | Within ±45 | 0.5 or more | Small movement + no rotation | No change |
| 11 | Holding in hand + non-walking | 0-1 | Within ±30 | Beyond ±45 | 0.5 or more | Small movement + vertical rotation | 30%-60% |
| 12 | Holding in hand + non-walking | 0-1 | Beyond ±30 | Within ±45 | 0.5 or more | Small movement + horizontal rotation | 10%-30% |
| 13 | Holding in hand + non-walking | 0-1 | Beyond ±30 | Beyond ±45 | 0.5 or more | Small movement + horizontal/vertical rotation | Stop |
| 14 | Holding in hand + non-walking | Beyond 1 | Within ±30 | Within ±45 | 0.5 or more | Large movement + no rotation | 30%-60% |
| 15 | Holding in hand + non-walking | Beyond 1 | Within ±30 | Beyond ±45 | 0.5 or more | Large movement + horizontal rotation | 0%-30% |
| 16 | Holding in hand + non-walking | Beyond 1 | Beyond ±30 | Within ±45 | 0.5 or more | Large movement + vertical rotation | Stop |
| 17 | Holding in hand + non-walking | Beyond 1 | Beyond ±30 | Beyond ±45 | 0.5 or more | Large movement + horizontal/vertical rotation | Stop |
| 18 | Holding in hand + non-walking | Beyond 1 | Within ±30 | Within ±45 | 0.2 or less | Tapping | Stop |
| 19 | — | | Walking pattern | — | — | 3 or more | Walking | Stop |
| 20 | — | | Free fall | — | — | — | Falling | Stop |

The correspondence represented in Table 3 is a table representing a relationship between a last operation pattern, and an acceleration, a vertical angle variation, a horizontal angle variation, a duration time, a result of determining an operation, and set light intensity (light amount) which are detected by the 6-axis sensor 236. Here, the vertical angle variation and the horizontal angle variation are angle variations varying from before a given time (0.5 seconds according to the present embodiment), and are calculated based on the angle information transmitted from the 6-axis sensor 236. The duration time is a duration time for detection of the change in acceleration, and when the detected acceleration is continuously detected during the duration time, it is determined that the condition is satisfied. The last pattern is a currently selected operation pattern. The last pattern is set to the stationary pattern in a default state on activation.

For example, status number 1 in Table 3 is a status selected when the mobile electronic device 210 is moved by a little amount or less and is not rotated, and is selected when the last operation pattern is the stationary pattern, the acceleration during 0.5 seconds or more is 0 G-1 G, that is, 0 G or more and less than 1 G, the vertical angle variation is within ±15 degrees with respect to the position at a base time (before 0.5 seconds), and the horizontal angle variation is within ±30 degrees with respect to the position at the base time (before 0.5 seconds). Status number 2 is a status selected when the mobile electronic device 210 is moved by a little amount or less and is rotated in the vertical direction, and is selected when the last operation pattern is the stationary pattern, the acceleration during 0.5 seconds or more is 0 G-1 G, the vertical angle variation is within ±15 degrees with respect to the position at the base time (before 0.5 seconds), and the horizontal angle variation is beyond ±30 degrees with respect to the position at the base time (before 0.5 seconds). Status number 9 is a status selected when the mobile electronic device 210 is tapped, and is an operation pattern selected when the last operation pattern is the stationary pattern, the acceleration during 0.2 seconds is beyond 1 G, that is, greater than 1 G, the vertical angle variation is within ±15 degrees with respect to the position at the base time (before 0.5 seconds), and the horizontal angle variation is within ±30 degrees with respect to the position at the base time (before 0.5 seconds). Status number 19 is a status selected when the operator is walking with the mobile electronic device 210 in hand, and is selected when an acceleration pattern indicating walking 3 seconds or more is detected regardless of the last operation pattern and the detected angle variation. Status number 20 is a status selected when the mobile electronic device 210 is dropped, and is selected when its free-fall is detected regardless of the last operation pattern and the detected angle variation. Likewise, each of the other status numbers is selected when the conditions, such as the last operation pattern, and the acceleration, the vertical angle variation, the horizontal angle variation, and the duration time which are detected by the 6-axis sensor 236, are satisfied.

After acquiring the data table at Step S432, the control unit 22 calculates, as Step S434, a set value of the light amount and changes the light-amount set value based on the correspondence stored in the acquired data table, the acceleration information, and the angle information acquired at Step S430. In other words, in the cases of the other status numbers similarly to the above, the control unit 22 checks the last operation pattern, and the acceleration, the vertical angle variation, the horizontal angle variation, and the duration time which are detected by the 6-axis sensor 236 against the data table, calculates a corresponding status number, and calculates the light intensity of the status number as a light-amount set value. For example, when the status satisfies the conditions of status number 1, the control unit 22 calculates a set value indicating that the light amount is not changed, and when the status satisfies the conditions of status number 2, the control unit 22 calculates a set value indicating that the light amount is set to 30% to 60%. In the actual case of control, the control unit 22 calculates a light-amount set value, of 30% to 60%, preset by the operator. After calculating the light-amount set value, the control unit 22 changes the setting of the light amount (light-amount adjusting value) of the projector 134 based on the calculated set value. When the operation pattern is not detected or in the initial stage on detection, the last operation pattern is set to the stationary pattern.

After changing the light-amount adjusting value at Step S434, the control unit 22 reads the operation pattern as Step S436. That is, the control unit 22 acquires information about the operation pattern transmitted by the 6-axis sensor 236 at Step S410. The control unit 22 updates the acquired information about the operation pattern as a current operation pattern. That is, the control unit 22 updates the information for an item corresponding to the last operation pattern in Table 3.

After acquiring the information about the operation pattern at Step S436, the control unit 22 determines whether the image projection by the projector 134 is terminated, as Step S438. Here, the control unit 22 determines whether the image projection is terminated, based on whether the termination instruction is received. The termination instruction is received through an operation by the operator, is received when no image to be projected remains, or is received when the remaining amount of a battery becomes a given value or less. When it is determined at Step S438 that the image projection is terminated (Yes), the control unit 22 terminates the drive of the projector 134 as Step S440, turns off the power for the projector 134, and, thereafter, ends the process. When it is determined at Step S438 that the image projection is not terminated (No), the control unit 22 proceeds to Step S430, and repeats from Step S430 to Step S438. The mobile electronic device 210 operates in the above manner.

In this way, by adjusting the amount of light emitted from the projector according to the acceleration and the angle variation of the mobile electronic device 210 detected by the 6-axis sensor, the change in the position irradiated with the light emitted from the projector 134 can be more accurately detected. For example, it is possible to accurately detect whether the direction of the mobile electronic device 210 is slowly and largely changing, the direction thereof is suddenly changing, the irradiation position is changing upwardly, or the irradiation position is changing horizontally. This allows a more appropriate amount of light to be emitted according to the status of the mobile electronic device 210, and enables the control in such a manner that the light of smaller light amount is emitted as the possibility that the light may enter person's eyes by sudden change of the irradiation position increases, thus further enhancing the safety and the operability.

By detecting the operation pattern and adjusting the amount of light emitted from the projector according to the detected operation pattern, a more appropriate amount of light can be emitted according to the status of the mobile electronic device 210. The mobile electronic device 210 detects statuses such as walking during which it is not generally assumed that the projector 134 is used, falling of the mobile electronic device 210 is falling. Then the mobile electronic device 210 adjusts the light amount according to the status. This allows the mobile electronic device 210 to detect a more appropriate amount of light from the projector. Moreover, by detecting how the mobile electronic device is tapped and adjusting the light amount based on the tapping, the light amount can be easily adjusted only by tapping the mobile electronic device 210 without operating the operation keys.

A given time is required to detect the operation pattern, and therefore a more appropriate light amount can be set in short time so as to adjust the light amount based on the result of detection of the acceleration without waiting for calculation of the operation pattern. For example, when the operator is holding in hand the mobile electronic device 210, the light amount can be reduced as the stationary mode based on the result of detection before the holding in hand pattern is detected. This enables the light amount to be appropriately adjusted even in a short period of time until the operation pattern is detected.

The embodiment is configured to set the light amount to 50% when the tapping pattern is detected as the operation pattern, however, the light amount is not limited thereto. Therefore, the light amount may be changed each time the tapping pattern is detected or each number of tapping times. For example, the light amount may be changed each time it is tapped in the order of 80%, 60%, 40%, 20%, and 0%. The emission of the light from the projector may be stopped by one tapping.

The cases of status numbers 3, 4, 6, 7, 12, 13, 15, and 16 represented in Table 3 are determined that each irradiation direction is changed, and if the light amount is once reduced, it is preferable to set so as not to return the light amount to 100% until the recovery operation is performed by the operator. That is, if the light amount is once reduced, it is preferable not to automatically increase the light amount until the operator checks the status (until some permission signal is received) even if the status indicates status number 1. In this way, when the irradiation direction of the light is changed, the light amount is not increased until the permission is input by the operator, and this enables a person not to be dazzled by the light even when the person happens to enter the projection area.

The cases of status numbers 2, 5, 11, and 14 represented in Table 3 are determined that each irradiation step is changed, and thus, it is preferable to set so as to return the light amount to 100% after the status of, for example, status number 1 continues a given time after the light amount is once reduced. In this case, because the irradiation direction is not changed, there is less probability that a person is present in the projection area. Therefore, the operability can be enhanced while the possibility that the person may be dazzled by the light is kept low.

The cases of status numbers 8, 17, and 20 represented in Table 3 are largely changed. Therefore, it is preferable to set so that when a detection mode for determining whether the device is broken is executed and a recovery operation is further preformed by the operator, the light amount is recovered to 100%. By checking whether it is broken, it is possible to prevent the light from being emitted when the projector 134 is abnormal and to prevent an unpredictable amount of light from being emitted in a direction which cannot be predicted.

The case of status number 19 requires a time up to detection more than that of each of the other status numbers. Therefore, the status of a status number detected by the status of status numbers 1 to 18 or 20 is controlled, and thereafter, when the conditions of the status number 19 are satisfied, then the operation of the status number 19 or the stop of the irradiation is simply performed. Thus, the light amount can be appropriately controlled even in a period before the operation of the status number 19 is performed. In the case of the status number 19, also, if the light amount is once reduced, it is preferable to set so as not to recover the light amount to 100% until the recovery operation is performed by the operator.

Here, as an image projected by the projector 34 or by the projector 134, various images can be projected. For example, news information may be projected. If such news information is to be projected, the news information may be automatically projected in response to reception thereof by previous setting. In addition, an electronic book and a recipe may be projected. In this case, a page may be set to proceed to the next at each given time. In the case of recipe, information for cooking time or the like is previously stored in software to be displayed, and a screen may be set so as to proceed to the next according to the cooking time.

Moreover, a clock, a countdown timer, or a stop watch may be projected. When it is combined with an alarm function, its projection may automatically be started from a several seconds set in the alarm. Projection may be preformed so as to combine it with a snooze function of the alarm and be getting larger or getting brighter the light amount of an image to be projected. Furthermore, when it is displayed in a blinking manner, a blinking period may be speeded.

When a mobile electronic device includes the 6-axis sensor capable of detecting geomagnetism as explained in the mobile electronic device 210, the result of detection by the 6-axis sensor may be used when an image is projected from the projector 34 or from the projector 134. For example, it may be configured that geomagnetism is detected by the 6-axis sensor and a starry sky in a direction in which the projector 34 or the projector 134 irradiates light may be projected. In other words, the starry sky seen in that direction may be projected according to a time and a season. Likewise, a map may be projected according to the light irradiation direction.

INDUSTRIAL APPLICABILITY

As explained above, the mobile electronic device according to the present invention is suitable for projecting an image in a state in which high safety is ensured.

The invention claimed is:

1. A mobile electronic device comprising:
an image projector configured to project an image;
a control unit configured to control an operation of the image projector;
a cabinet configured to hold the image projector and the control unit; and
a detector configured to detect a physical amount changing according to force acting on the cabinet,
wherein the control unit sets an amount of light from the image projector based on a result of detection by the detector,
wherein the detector is an acceleration sensor configured to detect an acceleration acting on the cabinet,
wherein when an acceleration value detected by the acceleration sensor is equal to the given value or more, the control unit stops the emission of light from the image projector or reduces the amount of light emitted from the image projector, and, thereafter, resumes projection of an image with a normal amount of light from the image projector only when it is detected that a preset operation is received.

2. A mobile electronic device comprising:
an image projector configured to project an image;
a control unit configured to control an operation of the image projector;
a cabinet configured to hold the image projector and the control unit; and
a detector configured to detect a physical amount changing according to force acting on the cabinet,
wherein the control unit sets an amount of light from the image projector based on a result of detection by the detector, further comprising:
a storage unit configured to store therein a correspondence between a detected value detected by the detector and an amount of light emitted from the image projector,
wherein the detector is an acceleration sensor configured to detect an acceleration acting on the cabinet, and the control unit sets an amount of light emitted from the image projector based on a detected value detected by the acceleration sensor and the correspondence stored in the storage unit,
wherein the acceleration sensor includes
an acceleration detector configured to detect an acceleration, and
a pattern detector configured to calculate an operation pattern based on a detected value detected by the acceleration detector,
the storage unit further stores therein an operation-pattern correspondence between the operation pattern and the amount of light emitted from the image projector, and the control unit sets an amount of light emitted from the image projector based on the operation pattern detected by the pattern detector and the operation-pattern correspondence.

3. A mobile electronic device comprising:
an image projector configured to project an image;
a control unit configured to control an operation of the image projector;
a cabinet configured to hold the image projector and the control unit; and
a detector configured to detect a physical amount changing according to force acting on the cabinet,
wherein the control unit sets an amount of light from the image projector based on a result of detection by the detector,
wherein the detector is a 6-axis sensor including an acceleration detector configured to detect accelerations in the three directions acting on the cabinet and a geomagnetic detector configured to detect geomagnetism in the three directions, and when at least either an acceleration value acting on the cabinet or a rotation range of the cabinet detected by the 6-axis sensor exceeds a given value or more, the control unit stops emission of light from the image projector or reduces an amount of light emitted from the image projector.

4. The mobile electronic device according to claim 3, further comprising a storage unit configured to store therein a correspondence between a detected value detected by the 6-axis sensor and an amount of light emitted from the image projector,
wherein the control unit sets an intensity of light emitted from the image projector based on a detected value by the 6-axis sensor and the correspondence.

5. The mobile electronic device according to claim 4,
wherein the 6-axis sensor includes a pattern detector configured to calculate an operation pattern based on at least either a detected values detected by the acceleration detector or by the geomagnetic detector,
the storage unit stores therein a respective correspondence for each operation pattern, and
the control unit determines a correspondence to be used based on the operation pattern detected by the pattern detector.

* * * * *